US006430303B1

(12) United States Patent
Naoi et al.

(10) Patent No.: US 6,430,303 B1
(45) **Date of Patent: *Aug. 6, 2002**

(54) IMAGE PROCESSING APPARATUS

(75) Inventors: Satoshi Naoi; Hiroichi Egawa; Morito Shiohara, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/564,535

(22) Filed: May 4, 2000

Related U.S. Application Data

(62) Division of application No. 08/681,485, filed on Jul. 23, 1996, now Pat. No. 6,141,435, which is a continuation of application No. 08/220,929, filed on Mar. 31, 1994, now abandoned.

(30) Foreign Application Priority Data

Mar. 31, 1993 (JP) ............................................ 5-073319
May 25, 1993 (JO) ............................................ 5-122563

(51) Int. Cl.$^{7}$ ................................................ G06K 9/00
(52) U.S. Cl. ........................ 382/104; 382/106; 340/937
(58) Field of Search ................................ 382/104, 106; 348/148, 149; 340/937; 701/117

(56) References Cited

U.S. PATENT DOCUMENTS

| | | | | |
|---|---|---|---|---|
| 4,214,265 A | * | 7/1980 | Olesen | 348/149 |
| 4,449,144 A | | 5/1984 | Suzuki | |
| 4,667,233 A | | 5/1987 | Furukawa | |
| 4,937,878 A | | 6/1990 | Lo et al. | |
| 5,034,986 A | | 7/1991 | Karmann et al. | |
| 5,109,435 A | | 4/1992 | Lo et al. | |
| 5,150,426 A | | 9/1992 | Banh et al. | |
| 5,177,794 A | | 1/1993 | Abe et al. | |
| 5,243,418 A | | 9/1993 | Kuno et al. | |
| 5,301,239 A | | 4/1994 | Toyama et al. | |
| 5,309,137 A | * | 5/1994 | Kajiwara | 348/148 |
| 5,515,448 A | * | 5/1996 | Nishitani | 382/106 |
| 5,590,217 A | * | 12/1996 | Toyama | 382/104 |
| 5,809,161 A | | 9/1998 | Auty et al. | |

FOREIGN PATENT DOCUMENTS

| | | |
|---|---|---|
| JP | 61-243569 | 10/1986 |
| JP | 63-20578 | 1/1988 |
| JP | 63-314988 | 12/1988 |
| JP | 3-206574 | 9/1991 |
| JP | 5-159057 | 6/1993 |
| JP | 5-159058 | 6/1993 |

* cited by examiner

*Primary Examiner*—Jon Chang
(74) *Attorney, Agent, or Firm*—Staas & Halsey LLP

(57) ABSTRACT

An image processing apparatus for extracting the specified objects has a background image extract unit for extracting a background; a first average background extract unit which extracts an image that includes a plurality of stationary and moving objects each having a speed not higher than a predetermined first speed and also the background; a second average background extract unit which extracts an image that includes the stationary and moving objects each having a speed not higher than a predetermined second speed and also the background; a first difference-calculation processing unit which calculates a difference between an output from the background image extract unit and an output from the first average background extract unit as a first speed image; a second difference-calculation processing unit which calculates a difference value between two outputs from the first and second average background extract units as a second speed image; and a third difference-calculation processing unit which calculates a difference value between an original image and either one of outputs from the first and second average background extract units as a third speed image.

7 Claims, 27 Drawing Sheets

Fig.5(B)

SETTING OF LUT

CACE OF ①

| | | |
|---|---|---|
| if | $i \geqq th1$ | $k = 3$ |
| else | | $k = 0$ |

CACE OF ②

| | | |
|---|---|---|
| if | $\lvert i-j \rvert > th2$ | $k = \lvert i-j \rvert$ |
| else | | $k = 0$ |

CACE OF ③

| | | |
|---|---|---|
| if | $i = j$ | $k = j$ |
| else | $0 \leqq (i-j) \leqq th31$ | $k = j + \alpha 31$ |
| else | $0 \leqq (j-i) \leqq th31$ | $k = j - \alpha 31$ |
| else | $th31 < (i-j) \leqq th32$ | $k = j + \alpha 32$ |
| else | $th31 < (j-i) \leqq th32$ | $k = j - \alpha 32$ |

CACE OF ④

| | | |
|---|---|---|
| if | $i = j$ | $k = j$ |
| else | $0 \leqq (i-j) \leqq th41$ | $k = j + \alpha 41$ |
| else | $0 \leqq (j-i) \leqq th41$ | $k = j - \alpha 41$ |
| else | $th41 < (i-j) \leqq th42$ | $k = j + \alpha 42$ |
| else | $th41 < (j-i) \leqq th42$ | $k = j - \alpha 42$ |

FOR EXAMPLE

| | | | |
|---|---|---|---|
| $th1 = 5$ | | $th2 = 50$ | |
| $th31 = 10$ | $\alpha 31 = 1$ | $th32 = 255$ | $\alpha 32 = 3$ |
| $th41 = 10$ | $\alpha 41 = 1$ | $th42 = 255$ | $\alpha 42 = 10$ |

TIME t

TIME t + SEVERAL SECONDS

TIME t

TIME t + SEVERAL SECONDS

TIME t

TIME t + SEVERAL SECONDS

TIME t

TIME t + SEVERAL SECONDS

TIME t

TIME t + SEVERAL SECONDS

TIME t

TIME t + SEVERAL SECONDS

TIME t

TIME t + SEVERAL SECONDS

TIME t

TIME t + SEVERAL SECONDS

TIME t

TIME t + SEVERAL SECONDS

Fig.17(A)
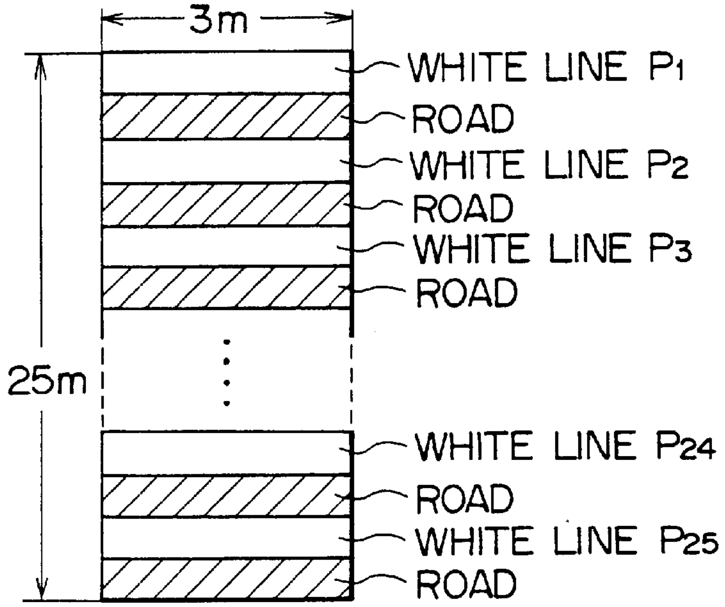
Fig.17(B)
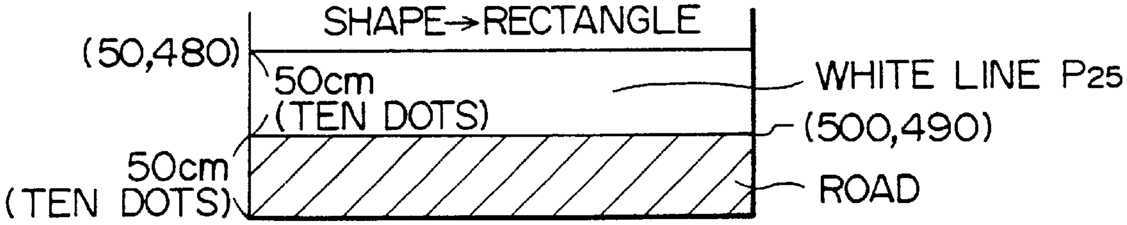
Fig.17(C)
| WHITE NUMBER | LEFT UPPER END | RIGHT LOWER END |
|---|---|---|
| P1 | (50, 0) | (500, 10) |
| P2 | (50, 20) | (500, 30) |
| ⋮ | ⋮ | ⋮ |
| P25 | (50, 480) | (500, 490) |

| WHITE LINE NUMBER | LEFT UPPER END | RIGHT LOWER END |
|---|---|---|
| $P_1$ | (100, 0) | (200, 10) |
| $P_2$ | (100, 20) | (200, 30) |
| ... | | |
| $P_{25}$ | (100,480) | (200,490) |

(OBJECT TO BE PROCESSED)

(BINARY CODE PROCESSING UNIT)

```
if (th1>INij>th2)  then OUTij = 1
else                    OUTij = 0
```

(NOISE CANCELING UNIT)

MARKER + OBJECT

HORIZONTAL PROJECTION VALUE (Pjh)

| WHITE NUMBER | $T_1$ | $T_2$ | $T_3$ | $T_4$ | $T_5$ |
|---|---|---|---|---|---|
| $P_1$ | | | | O | |
| $P_2$ | | | O | | |
| $P_3$ | | O | | | O |
| $P_4$ | O | | | O | |
| $P_5$ | | | O | | |
| | ⋮ | ⋮ | ⋮ | ⋮ | ⋮ |
| $P_{25}$ | | | | | |

| WHITE NUMBER | $T_1$ | $T_2$ | $T_3$ | $T_4$ | $T_5$ |
|---|---|---|---|---|---|
| $P_1$ | | | | (1) | |
| $P_2$ | | | (1) | | |
| $P_3$ | | (1) | | | (2) |
| $P_4$ | (1) | | | (2) | |
| $P_5$ | | | (2) | | |
| | ⋮ | ⋮ | ⋮ | ⋮ | ⋮ |
| $P_{25}$ | | | | | |

| WHITE NUMBER | $T_1$ | $T_2$ | $T_3$ | $T_4$ | $T_5$ |
|---|---|---|---|---|---|
| $P_1$ | | | O | | |
| $P_2$ | | O | | | |
| $P_3$ | O | | | | O |
| $P_4$ | | | | O | |
| $P_5$ | | | O | | |
| $P_6$ | | O | | | |

| WHITE NUMBER | $T_1$ | $T_2$ | $T_3$ | $T_4$ | $T_5$ |
|---|---|---|---|---|---|
| $P_1$ | | | (1)' | | |
| $P_2$ | | (1)' | | | |
| $P_3$ | (1)' | | | | (2)' |
| $P_4$ | | | | (2)' | |
| $P_5$ | | | (2)' | | |
| $P_6$ | | (2)' | | | |

(BINARY INFORMATION)

(CONTOUR EXTRACT)

(BINARY INFORMATION)

(CONTOUR EXTRACT)

| 1 | 1 | 1 |
|---|---|---|
| 1 | 1 | 1 |
| 1 | 1 | 1 |

$(i, j)$ (LOGICAL FILTER)

IMAGE PROCESSING APPARATUS

This application is a division of application Ser. No. 08/681,485, filed Jul. 23, 1996, now U.S. Pat. No. 6,141,435 which, in turn, is a continuation of application Ser. No. 08/220,929 filed Mar. 31, 1994, now abandoned.

BACKGROUND OF THE INVENTION

1. Field of the Invention

The present invention relates to an image processing apparatus for accurately extracting one or a plurality of objects utilizing a thresholded differential image processing technique when a plurality of stationary objects and a plurality of moving objects are contained together in an image of a time sequence of images.

More specifically, the present invention relates to an image processing apparatus, which allows both a background image and an image including at least one stationary object or at least one moving object (having a speed not more than a predetermined speed) to be extracted, and also allows a difference-calculation process to be carried out between the images.

In such an image processing system, it is possible to distinguish a stationary object or a moving object in the images and it is also possible to analyze the movement of each of the moving objects.

Further, the present invention relates to an image processing apparatus, in which a plurality of markers are provided in a background where the objects move, and these markers are extracted by utilizing an image processing technique similar to the case in which the moving objects are extracted, and further it is discriminated whether or not the thus extracted markers are in the steady state.

If the markers are in the steady state, portions where the moving objects and the markers overlap each other can be determined. Therefore, the number of the markers (the size of markers displayed in each image), which are in the steady state and exist between two moving objects, can be calculated to obtain a distance between two moving objects.

In general, supervisory systems using the above-mentioned image processing technique can be utilized in various places. Each of these supervisory systems serves to rapidly locate an accident, a disaster, and the like. Recently, such supervisory systems are likely to be utilized for preventing such accidents, disasters, and the like, in addition to a function of merely detecting the existence of an accident, etc.

To meet this need, it is necessary to extract or identify an object which moves with an abnormal motion that will cause such an accident, a disaster, and the like. Therefore, an efficient technique is needed for rapidly and accurately detecting a moving object which demonstrates such an abnormal motion.

More specifically, it is required for the supervisory system to detect and analyze the movement of each of a plurality of moving objects contained in a series of images. Further, it is also necessary for the supervisory system to rapidly calculate a distance between the two moving objects with a high degree of accuracy.

2. Description of the Related Art

Some techniques for analyzing the movement of each of a plurality of moving objects by utilizing an image processing apparatus are typically disclosed in Japanese Unexamined Patent Publication (Kokai) No. 5-159057 and No. 5-159058.

In each of these techniques, first, regions where moving objects may be positioned are extracted using a predetermined assumption. Next, a specified moving object is distinguished from the other objects, on the basis of various characteristics, e.g., the size of each of the regions, and the central position of each region. Subsequently, in accordance with a change of the position of the moving object with a lapse of time, the movement of the moving object can be analyzed.

For example, when an analysis of the motion of a man is to be performed, a given portion of an image which is to be analyzed, is extracted from the image. Next, with respect to the extracted portion, i.e., an object to be processed, various characteristics, e.g., the position of projections and the location of central positions, are calculated, and used to distinguish the object from the other portions. Further, the process is executed with respect to a plurality of images in a time series, i.e., continuous motion type images.

According to the above-mentioned technique, to ensure obtaining adequate attributes, e.g., a speed of the object, it is necessary to analyze all the areas where the same original object can exist in the time series, and to identify the objects as the same original object.

More specifically, if a plurality of objects respectively existing in a plurality of the time series images are not accurately correlated with each other, by analyzing all the areas where the object can exist, it is difficult to calculate the speed of the object with a sufficiently high accuracy.

In the case where only one moving object exists, a process for correlating a plurality of objects in the continuous images with each other is relatively simple. In this case, it is possible to easily obtain the attributes, e.g., a speed of the moving object, using changes in the time base.

However, especially in the case where a large number of moving objects exist in one image, a process for correlating a plurality of objects in the time series images with each other for all the moving objects becomes difficult.

Further, when a plurality of stationary objects exist, as well as a plurality of moving objects, it becomes extremely difficult to rapidly complete such a correlation process for all of the stationary and moving objects using real time processing with a frame rate processing determined by a frequency of a video signal.

Furthermore, when a plurality of moving objects respectively move with a speed different from each other, it becomes almost impossible to complete the correlation process for all of the moving objects using real time processing determined by the frequency of a video signal (a video frame rate).

SUMMARY OF THE INVENTION

In view of the above-described problems existing in the prior art, the main object of the present invention is to provide an image processing apparatus which allows one or a plurality of objects to be rapidly and accurately extracted and analyzed, in a case where a large number of moving objects exist in a time series image.

A further object of the present invention is to provide an image processing apparatus which allows one or a plurality of objects to be rapidly and accurately extracted and analyzed, even in the case where a plurality of stationary objects exist, as well as a plurality of moving objects.

A still further object of the present invention is to provide an image processing apparatus which allows the movement of each of a plurality of moving objects to be rapidly and accurately extracted and analyzed, even in the case where the plurality of moving objects respectively move with different speeds.

A still further object of the present invention is to provide an image processing apparatus which allows all of the stationary and moving objects to be correlated with each other during real time processing with a processing rate determined by a frequency of a video signal, in the case where a plurality of stationary objects exist, as well as a plurality of moving objects, and also in a case where the plurality of moving objects respectively move with different speeds.

A still further object is to provide an image processing apparatus which allows a distance between two moving objects to be calculated, so that an abnormal object motion that may bring about an accident, a disaster, and the like, can be rapidly detected.

To attain these objects, the image processing apparatus according to the present invention includes an image-input unit which inputs an image including a background and a plurality of the objects; a background image extract unit which extracts the background; a first average background extract unit which extracts an image that includes one or a plurality of stationary objects or moving objects each having a speed not higher than a predetermined first speed and also includes the background; and a second average background extract unit which extracts an image that includes the stationary objects or moving objects each having a speed not higher than a predetermined second speed and also includes the background.

Further, the image processing apparatus of the present invention further includes a first difference-calculation processing unit which calculates a difference between an output from the background image extract unit and either one of outputs from the first average background extract unit, and then generates a first image containing objects moving at a first speed or stopped; a second difference-calculation processing unit which calculates a difference between respective outputs from the first and second average background extract units, and then generates a second image containing objects moving at a second speed; and a third difference-calculation processing unit which calculates a difference between an output from the image-input unit and either one of outputs from the first and second average background extract units, and then generates a third image containing objects moving at a third speed.

Preferably, the image processing apparatus of the present invention includes a plurality of local-area characteristic extract processing units which process outputs from the image-input unit. Each of the local-area characteristic extract processing units has a local-area determining unit which allocates the output from the image-input unit to each of a plurality of local areas; a labeling processing unit which separates at least one object from each of the local areas, by labeling the same object existing in each of the local areas; and a characteristic-amount calculating unit which calculates a plurality of characteristic-amounts or parameters, such as length and circumference, for the thus labeled object in the local areas.

Further, preferably, the image processing apparatus of the present invention operates to calculate a difference between the background and an average background image at a low speed, and to extract one or a plurality of connected areas where objects overlap.

Further, preferably, the image processing apparatus operates to produce a projection for each of the connected areas, and to calculate the position of the corresponding object in accordance with the projection, and to calculate a plurality of characteristics.

Further, preferably, the image processing apparatus operates to estimate a change in the position of the object and a change in the characteristics of the object for each sampling time period in the time series, and to determine whether the object is a stationary object, in a case where both the change in the position of the object and the change in the characteristics are small.

In a preferred embodiment, the image processing apparatus of the present invention is adapted to calculate a distance between two moving objects. The image processing apparatus includes an image-input unit which inputs the image including a background and a plurality of objects; a marker holding unit which places a plurality of markers in the background; a moving object extraction unit which extracts a plurality of moving objects; a tracing means which traces the plurality of moving objects; a marker extract unit which extracts the markers existing between the two different moving objects; and a distance measuring unit which calculates the distance between the moving objects, on the basis of the size of the extracted markers.

Further, in the image processing apparatus of a preferred embodiment, a plurality of other markers, which are not connected with each other by the marker holding unit, are provided in the background.

The image processing apparatus of a preferred embodiment further includes a connected-area position/shape calculating unit which calculates the size, the shape, and the number of the markers; a marker dictionary unit which has a marker dictionary for storing in advance the size and the shape of the markers; and a marker collating unit which collates the shape of the markers existing between two different moving objects and also collates the marker dictionary.

Further, the image processing apparatus of a preferred embodiment is adapted to calculate the number of the markers which can be identified as true markers based on a result of the collation in the marker collating unit, and to calculate the distance between two moving objects.

In a modified embodiment, the image processing apparatus of the present invention is adapted to calculate a distance between two cars in the case where a plurality of cars are the moving objects. In this case, a plurality of white lines are used as markers; these white lines are perpendicular to the direction in which the cars move with equal spaces between adjoining white lines.

Further, in this modified embodiment, the image processing apparatus has a distance measuring unit, which extracts the number of continuous white lines, and calculates the distance between two cars on the basis of the total sum of spaces between the continuous white lines between the two cars.

According to the image processing apparatus of the present invention, a plurality of objects existing in an image can be classified into a plural images each with objects of a different speed therein on the basis of the speed of each object, and the images can be analyzed in a process independent of each other.

Therefore, in the case where there are a large number of objects moving at various speeds, it becomes possible to separate objects in a certain classified range of speed from the remaining objects. Consequently, it becomes possible to easily and rapidly analyze the movement of only the objects within a certain range of speed.

Further, according to the image processing apparatus of the present invention, by extracting (or identifying) markers which can be easily processed by means of an image processing technique, portions where the moving objects and the markers overlap with each other can be easily determined, even though only a part of each moving object can be detected. Therefore, by calculating a distance between portions where the moving objects and the markers overlap with each other, it becomes possible to obtain a distance between two moving objects with a sufficiently high accuracy.

BRIEF DESCRIPTION OF THE DRAWINGS

The above objects and features of the present invention will be more apparent from the following description of the preferred embodiments with reference to the accompanying drawings, wherein:

FIGS. 5(A) and 5(B) are diagrams for explaining an example in which plural images are respectively extracted in a first preferred embodiment of the present invention;

FIGS. 17(A) to 17(C) are diagrams showing the condition in which markers are provided and various information about markers is registered in a marker dictionary, in a third preferred embodiment of the present invention;

DESCRIPTION OF THE PREFERRED EMBODIMENTS

Figure 1:
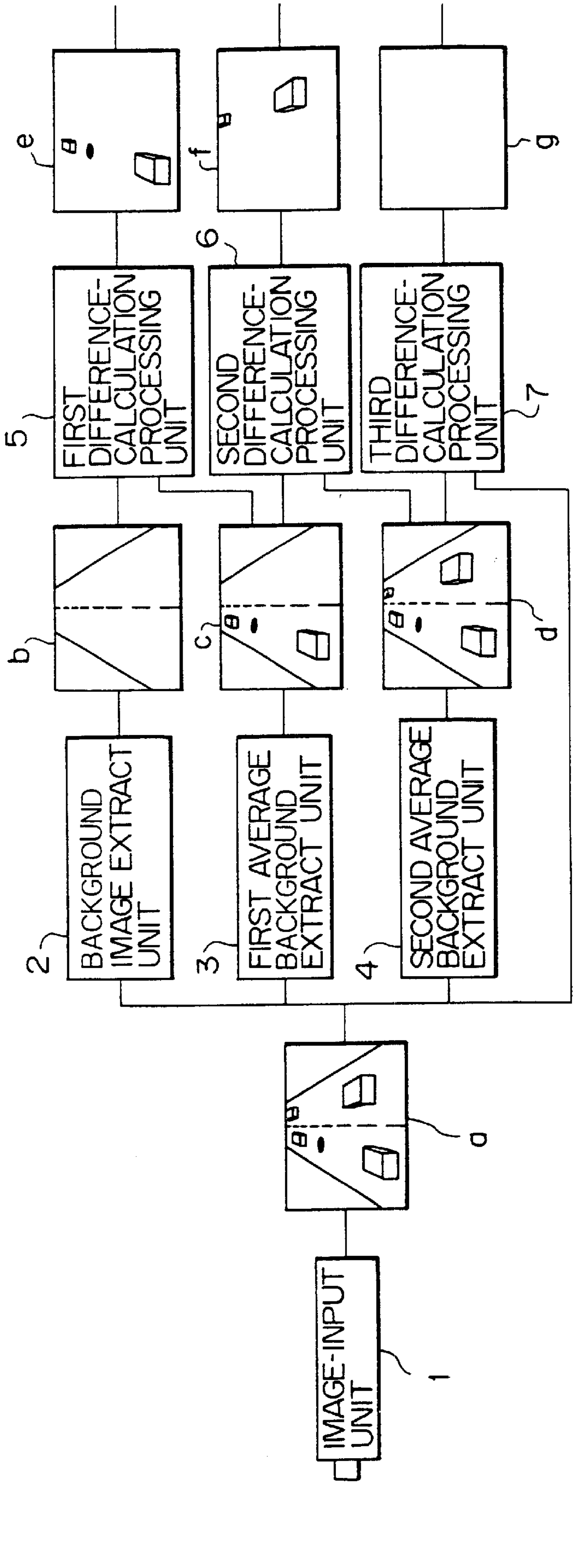
FIG. 1 is a schematic block diagram showing an essential embodiment based on the principal of the present invention.

FIG. 1 is a schematic block diagram showing an essential embodiment based on the principal of the present invention. In FIG. 1, fundamental components necessary for realizing an image processing apparatus of the present invention are illustrated. In this case, it is assumed that a plurality of stationary objects (i.e., stopped objects) and a plurality of moving objects are contained together as a group of objects in an image which is to be processed.

As shown in FIG. 1, an image processing apparatus of the present invention includes an image-input unit 1, a background image extract unit 2, a first average background extract unit 3, a second average background extract unit 4, a first difference-calculation processing unit 5, a second difference-calculation processing unit 6, and a third difference-calculation processing unit 7.

More specifically, an image-input unit 1 is typically constituted by a video camera, and serves to input an image including a background and all the objects captured by the camera.

The background image extract unit 2 extracts only a background by excluding the stopped objects and the moving objects from the input image. If the stationary objects and the moving objects do not exist in the image, the input image is stored in the background image extract unit 2. This background may be incorporated in advance into an image processing apparatus or image processing system.

The average background extract unit 3 extracts an image which includes the stationary objects, moving objects each having a low speed, and the background.

The second average background extract unit 4 extracts an image which includes the stationary objects, the moving objects each having a low speed, moving objects having each having a middle speed, and the background.

The first difference-calculation processing unit 5 calculates a difference between an output from the background image extract unit 2 and an output from the first average background extract unit 3. Further, the first difference-calculation processing unit 5 generates a first image including slow moving and stationary objects.

The second difference-calculation processing unit 6 calculates a difference between an output from the first average background extract unit 3 and an output from the second average background extract unit 4. Further, the second difference-calculation processing unit 6 generates a second image including objects moving at a higher speed.

The third difference-calculation processing unit 7 calculates a difference value between an output from the image-input unit 1 and an output from the second average background extract unit 4. Further, the third difference-calculation processing unit 7 generates a third image including objects moving at a still higher speed.

Here, as shown by an image "a" in FIG. 1, it is assumed that a stopped or stationary car exists in a traffic lane on the left side of a road, and also a low speed car moving at a low speed exists in the same traffic lane, and also an obstacle (indicated by a black mark in FIG. 1) exists in the same traffic lane. Further, it is assumed that two middle speed cars each moving at a middle speed exist in the traffic lane at the right side of the road. In such a case, the operation of the image processing apparatus of the present invention will be described.

First, an image "a" is sent from the image-input unit 1 and input to the background image extract unit 2, the first average background extract unit 3, and the second average background extract unit 4. Next, the image "a" is processed by the background image extract unit 2 and an image "b" including a background (background image) is output. The image "a" is also processed by the first average background extract unit 3, and an image "c" is output. The image "a" is also processed by the second average background extract unit 4, and an image "d" is output.

Thereafter, an image "e" corresponding to a difference between the background image "b" and the image "c" is output by the first difference-calculation processing unit 5. Further, an image "f" corresponding to a difference between the image "c" and the image "d" is output by the second difference-calculation processing unit 6. Further, an image "g" corresponding to a difference between the image "d" and the image "a" is output by the third difference-calculation processing unit 7.

More specifically, a stopped car, a low speed car, and an obstacle existing in a traffic lane at the left side of a road are extracted by the first difference-calculation processing unit 5 and output in the image "e". Further, two middle speed cars existing in the traffic lane at the right side are extracted by the second difference-calculation processing unit 6 and output in the image "f".

However, in this case, a high speed car moving at a speed higher than the middle speed does not exist. Therefore, nothing is extracted by the third difference-calculation processing unit 7 and output in the image "g".

In this way, it becomes possible to easily and selectively extract the movement of a plurality of moving objects, e.g., cars, which move at different speeds, at a relatively high rate corresponding to a frequency of a video signal.

Hereinafter, a more detailed description of and preferred embodiments of the present invention will be given with reference to FIGS. 2 to 26(E). Further, any component which is the same as that mentioned previously will be referred to using the same reference number.

Figure 2:
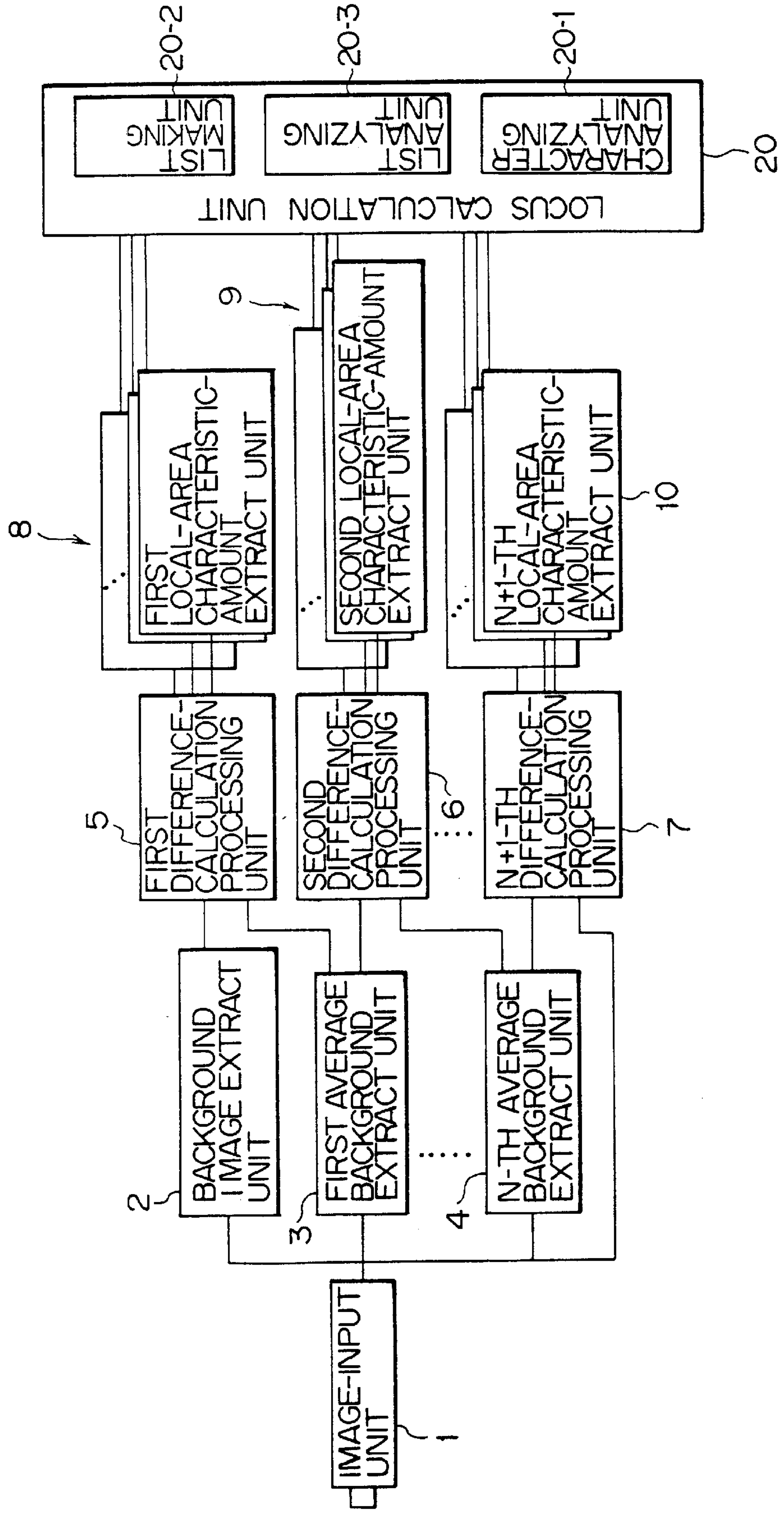
FIG. 2 is a schematic block diagram showing a first preferred embodiment of an image processing apparatus according to the present invention.

FIG. 2 is a schematic block diagram showing a first preferred embodiment of an image processing apparatus according to the present invention.

In FIG. 2, each of an image-input unit 1, a background image extract unit 2, and a first average background extract unit 3 have the same construction as that shown in FIG. 1. Therefore, each of these components in FIG. 2 is indicated with the same reference number as that is used in FIG. 1.

Further, unlike the apparatus in FIG. 1, the image processing apparatus shown in FIG. 2 includes N average background extract units where N denotes any natural number more than 2: N>2. Here, these extract units include a second average background extract unit through an N-th average background extract unit will be indicated as the N-th average background extract units 4'.

Also, the image processing apparatus shown in FIG. 2 includes N+1 difference-calculation processing units. Here, these difference-calculation processing units include a third difference-calculation processing unit through an N+1-th difference-calculation processing unit will be indicated as N+1-th difference-calculation processing units 7'.

The image processing apparatus shown in FIG. 2 further includes a first local-area characteristic-amount extract unit 8, a second local-area characteristic-amount extract unit 9, N+1-th local-area characteristic-amount extract units 10, and a locus calculation unit 20.

The first average background extract unit 3 extracts one or a plurality of stopped objects, one or a plurality of objects moving at a low speed, and a background. Further, the N-th average background extract units 4' extracts one or a plurality of stopped objects, a plurality of moving objects moving at speeds ranging from a low speed to a high speed, and a background. By utilizing these first average background extract unit 3 and N-th average background extract units 4', it becomes possible to generate images in which objects are classified by speed ranges.

In this case, between the first average background extract unit 3 and the N-th average background extract units 4', the second average background extract unit 4 shown in FIG. 1 may be provided.

The first difference-calculation processing unit 5 calculates a difference between an output from the background image extract unit 2 and an output from the first average background extract unit 3.

The second difference-calculation processing unit 6 calculates a difference between an output from the first average background extract unit 3 and either one of the respective outputs from the N-th average background extract units 4'.

The N+1-th difference-calculation processing units 7' calculates a difference between either one of the respective outputs from the N-th average background extract units 4' and an output from the image-input unit 1.

In such a construction, by virtue of plural difference-calculation processing units, it becomes possible to extract objects moving at a given speed or at the speed not higher than the given speed. In this case, as already described with reference to FIG. 1, the image processing apparatus may be constructed with only two average background extract units (N=2).

The number of these difference-calculation processing units depends on the number of average background extract units provided on the input side. However, the number of the difference-calculation processing units is independent of the average background extract units. It can be optionally determined which combinations of two outputs are selected from among the respective outputs from the average background extract units, to calculate the difference between the different outputs from the average background extract units, depending on the speed range(s) for which extraction of objects is desired. That is, the target speed ranges determines the number of difference-calculation processing units.

However, the maximum number of the difference-calculation processing units that can be provided is represented by the following equation:

$$X*(X-1)/2$$

where X is a sum of the number of the average background extract units, the background image extract unit, and an original image (from the image-input unit).

For example, in the case of FIG. 1, a value of X is 4, and the maximum of the difference-calculation processing units becomes 6.

The first local-area characteristic-amount extract unit 8 receives an output from the first difference-calculation processing unit 5. Further, as hereinafter described, the first local-area characteristic-amount extract unit 8 checks or determines whether certain characteristic-amounts or parameters that can be used to identify an object, which will for simplicity be called an object parameter, exists in a given first local area and calculates a characteristic or parameter concerning the shape of an object in the area, and the like. These characteristic amounts or parameters can include length, circumference, center-of-gravity and will be discussed in greater detail later herein.

In this case, by checking whether or not any characteristic-amounts or parameters exist, the change in position of an object can be determined. Further, by calculating a characteristic concerning the shape of the object, an attribute of the object having the shape, e.g., a bus, or a passenger car, can be determined.

The second local-area characteristic-amount extract unit 9 receives an output from the second difference calculation processing unit 6. Further, as hereinafter described, the second local-area characteristic-amount extract unit 9 checks whether any characteristic-amounts or object parameters exist in a given second local area and calculates a characteristic or parameter concerning the shape of the object, and the like.

The N+1-th local-area characteristic-amount extract units 10 respectively receives outputs from the N+1-th difference-calculation processing units 7'. Further, as hereinafter described, the N+1-th local-area characteristic-amount extract units 10 checks whether any characteristic-amounts or parameters exist in the N+1-th local area and calculates a characteristic or parameter concerning the shape of a specified object, and the like.

The locus calculation unit 20 detects the change in existence of characteristic-amounts or object parameters in the time series images and calculates a locus of the same moving object, on the basis of an output from each of a plurality of local-area characteristic-amount extract units 9, 10.

More specifically, the locus calculation unit 20 includes a character analyzing unit 20-1 which determines a locus of the same moving object, on the basis of a character concerning the shape of the moving object.

Further, the locus calculation unit 20 includes a list making unit 20-2 which detects an existence of the moving object in each of a plurality of local areas in time series, on the basis of an output from each of the local-area characteristic-amount extract units 9, 10, and which creates a list with respect to the results of the detection.

Further, the locus calculation unit 20 includes a list analyzing unit 20-3 which analyzes the list and recognizes a locus of the same moving object, even in a case where a large-scale moving object exists with a plurality of small-scale moving objects.

Figure 3A:
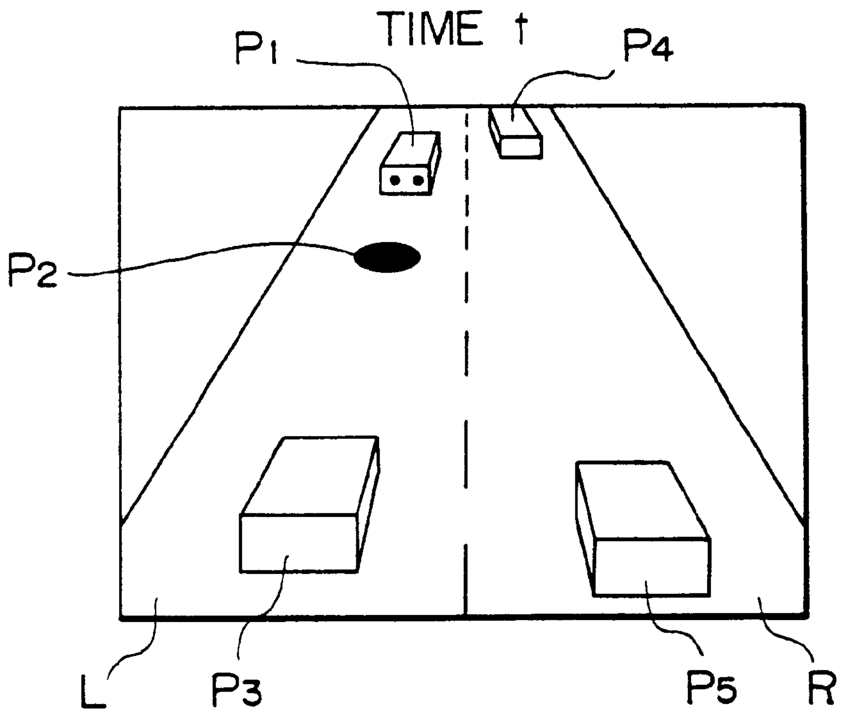
FIGS. 3(A) and 3(B) are diagrams showing an original image taken by an image-input unit in a tunnel in different sampling time, respectively.
Figure 3B:
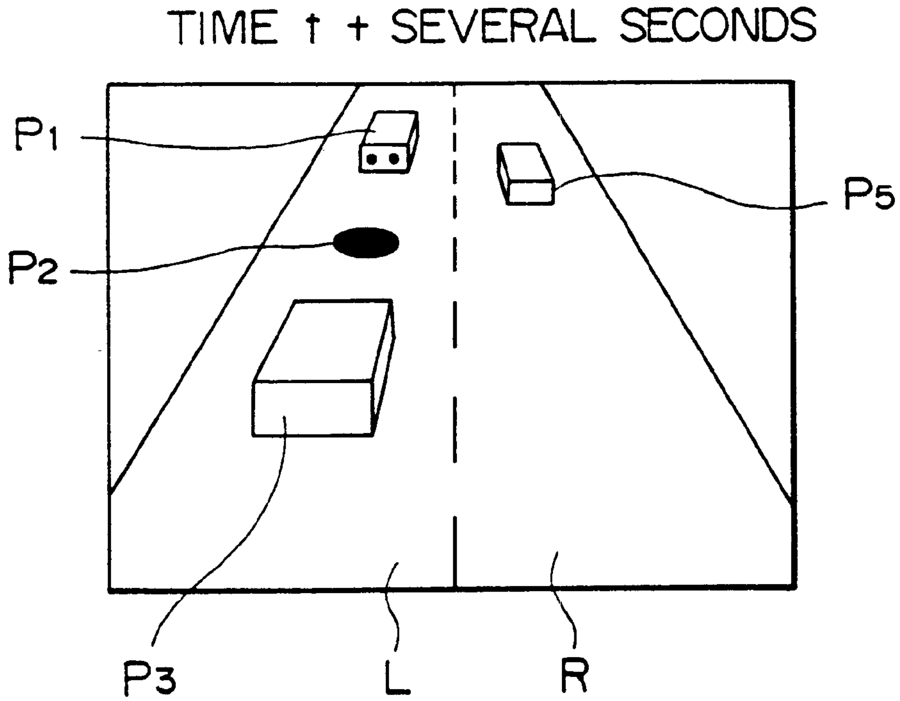

FIGS. 3(A) and 3(B) are diagrams showing original images which are taken by an image-input unit in a tunnel at different sampling times, respectively. In this case, an example, in which an image processing apparatus of the present invention is applied to a supervisory system for supervising a road in a tunnel, will be described.

More specifically, FIG. 3(A) indicates an original image which is taken at a certain or first sampling time and by means of an image-input means 1 that is placed in the tunnel; and FIG. 3(B) indicates another original image which is taken in a different or second sampling time that occurs several seconds after the first sampling time and by the same image-input means 1. The image-input means, e.g., a video camera, continuously takes images in the tunnel at high rate corresponding to a frequency of a video signal, which are sampled by a technique using a sampling time interval function such as a time series filter. That is, the image samples used for processing are taken at a frequency that is lower than the video frequency and can be as much as several seconds apart. Therefore, other images can be obtained during the sampling time period between the two images respectively shown in FIGS. 3(A) and 3(B). However, the illustration of the other images or images between those of FIGS. 3(A) and 3(B) will be omitted to simplify the explanation of FIGS. 3(A) and 3(B).

As apparent from FIGS. 3(A) and 3(B), in a traffic lane on the right side R, moving objects, e.g., a plurality of cars, normally move. However, in a traffic lane on the left side L, a stopped or stationary car P 1 exists in the lane, and the tail lamps of the car $P_1$ are flashing as illustrated by the dots. Also, an obstacle $P_2$ (for example, a fallen object) exists at the back of or behind the stopped car $P_1$. Further, it is assumed that the car $P_3$ which follows $P_1$ decelerates and moves at a low speed, since the car $P_3$ has seen the obstacle $P_2$.

Figure 4:
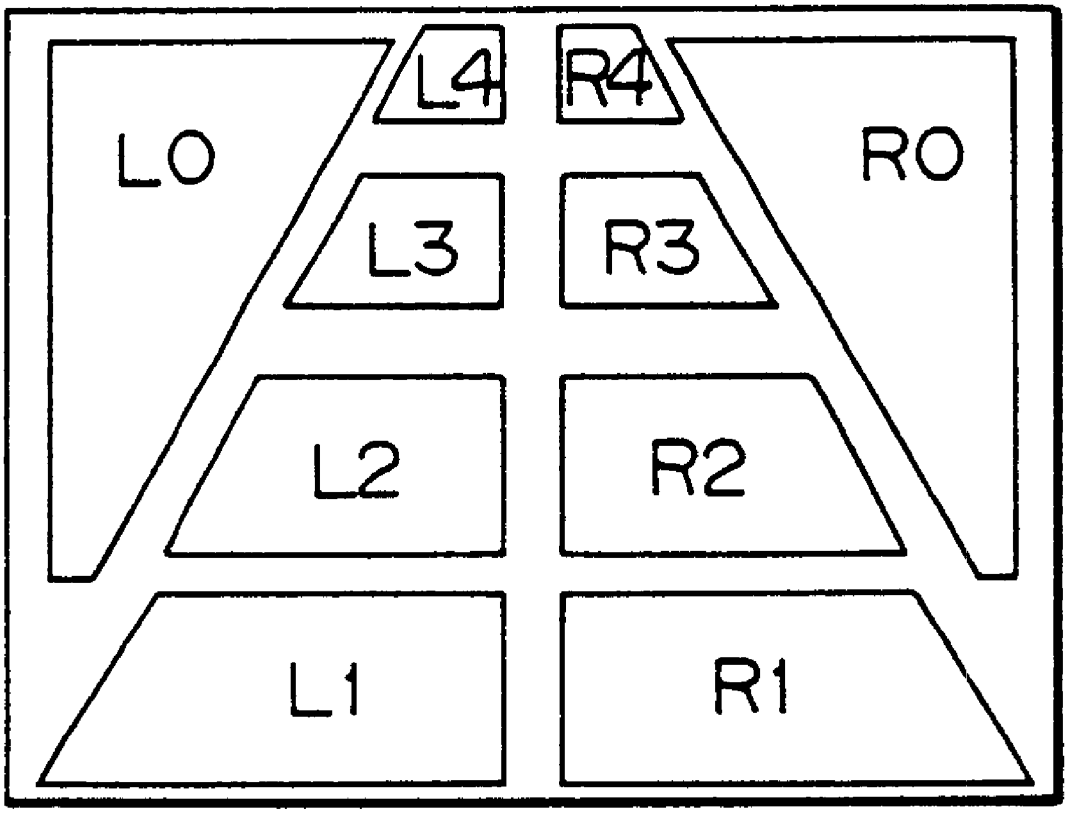
FIG. 4 is a diagram for explaining a plurality of local areas in a first preferred embodiment of the present invention.

Further, an image area which is captured by the image input means 1 is allocated or divided into a plurality of local areas, as shown in a diagram of FIG. 4. In FIG. 4, L0 to L4 denote local areas which are used to trace cars moving in the traffic lane on the left side L. Among these local areas L0 to L4, a local area L0 is used to detect a large-scale car in the traffic lane on the left side, while local areas L1 to L4 are used to trace all the cars on the left side.

On the other hand, R0 to R4 denote local areas which are used to trace cars moving in the traffic lane at the right side R. Among these local areas R0 to R4, a local area R0 is used to detect a large-scale car in the traffic lane on the right side, while local areas R1 to R4 are used to trace all the cars on the right side.

Figure 5A:
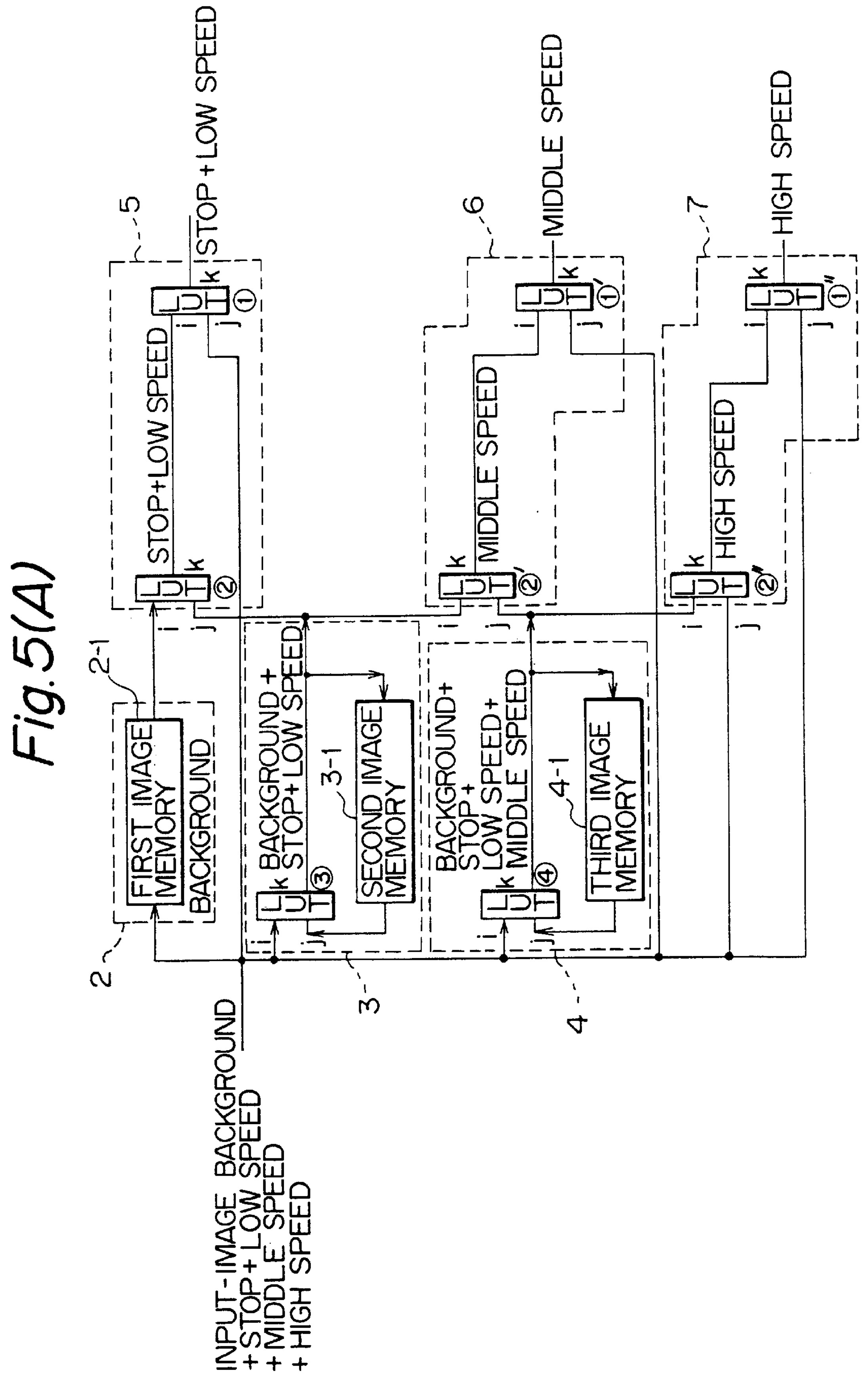

FIGS. 5(A) and 5(B) are diagrams for explaining an example in which images containing objects moving at different speeds are respectively extracted in a first preferred embodiment of the present invention. For example, one extracted image will include objects moving at a first speed and another extracted image will include objects moving at a second speed different from the first speed.

In FIGS. 5(A) and 5(B), all the objects are classified into three types of objects based on their speed. These three types of objects are stopped objects, objects moving at a low speed, and objects moving at a high speed, and the images containing these objects are output from the respectively corresponding extract units, as already described in FIG. 1 and FIG. 2 (N=2).

To be more specific FIG. 5(A) shows a background stored in a first image memory 2-1 in a background image extract unit 2. This background is input to a look-up table ② (in FIGS. 5(A) and 5(B), "look-up table" is abbreviated "LUT") in a first difference calculation processing unit 5, as one input "i" of the look-up table ②. As the other input "j" of the look-up table ②, an image corresponding to a sum of a background image, a stopped objects image, and an image of moving objects moving at a low speed (Background+Stop+Low speed) is input to the look-up table ②.

As shown in FIG. 5(B), if a value of |i−j| is equal to or larger than a threshold value th2 (for example, th2=50; |i−j|≧th2), the look-up table ② outputs the value of |i−j| as an output "k". With respect to a background image, since a value of one input "i" is equal to a value of the other input "j", a value of the output "k" is zero (k=0). Therefore, with respect to the output "k" of the look-up table ①, the value of |i−j| produces an output only in those portions of the input image where stopped objects and moving objects at a low speed exist, and this is then input to a look-up table ① as one input "i". That is, the output "k" includes stopped objects and slow moving objects only.

At this time, the other input "j" of the look-up table ① receives an input image (Background+Stopped+Low speed+Middle speed+High speed), which is taken by an image-input means 1. This input image includes a background image, stopped objects (including an obstacle), objects moving at a low speed, objects moving at a middle speed, and objects moving at a high speed. Therefore, the value of |i−j| input to the look-up table ① produces an output only in a portion where stopped objects and moving objects at a low speed exist (Stopped+Low speed).

In this case, as shown in FIG. 5(B), if a value of one input "i" of the look-up table ① is equal to or larger than a threshold value th1 (for example, th1=5; i≧th1), the look-up table ① outputs the value of the other input "j" as an output "k". On the other hand, if a value of one input "i" of the look-up table ① is smaller than the threshold value th1, a value of the output "k" is zero (k=0). Therefore, with respect to the output "k" of the look-up table ①, only stopped objects and objects moving at a low speed are extracted from the input image (Stopped+Low speed). That is, the output of the table ① is an image that includes only the stopped and slow moving objects found in the latest image from the image-input means 1.

Further, in FIGS. 5(A) and 5(B), an input image, which is captured by the image-input means 1, is also input to a look-up table ③ in a first average background extract unit 3, as input "i". On the other hand, an image, which has been stored in a second image memory 3-1, is also input to the look-up table ③ as the other input "j". In this case, if a value of one input "i" of the look-up table ③ is equal to a value of the other input "j" thereof, the same image as that stored in the image memory 3-1 is output from the look-up table ③, and then stored again in the image memory 3-1.

Further, if a value of (i−j) is in the range from zero through th31 (for example, th31=10; 0≦(i−j)≦th31), a value, which is obtained by adding an offset value α31 (for example, α31=1) to a value of the other input "j", is output from the look-up table ③. At the same time, the thus obtained value is also stored in the image memory 3-1. If a value of (j−i) is in the range from zero through th31 (0≦(j−i)≦th31), a value, which is obtained by subtracting an offset value α31 from a value of the other input "j", is output from the look-up table ③. At the same time, the thus obtained value is also stored in the image memory 3-1.

Further, if a value of (i−j) is larger than a threshold value th31 and equal to or smaller than a threshold value th32 (for example, th32=255; th31<(i−j)≦th32), a value, which is obtained by adding an offset value α32 (for example, α32=3) to a value of the other input "j", is output from the look-up table ③. At the same time, the thus obtained value is stored in the image memory 3-1. If a value of (j−i) is larger than a threshold value th31 and equal to or smaller than a threshold value th32 (for example, th32=255; th31 <(i−j) ≦th32), a value, which is obtained by subtracting an offset value α31 from a value of the other input "j", is output from the look-up table ③. At the same time, the thus obtained value is also stored in the image memory 3-1.

In this way, a value of an output "k" which is output from the look-up table ③ is a portion of an image including the background, stopped objects (this background and stopped objects exist in the condition i=j), and also objects moving at a low speed exist (Background+Stopped+Low speed). The reason why the output "k" is an output that includes image portions including objects moving at a low speed will be hereinafter described. The output "k" from the look-up table ③ is input to a look-up table ②' in a second difference-calculation processing unit 6, as one input "i".

At this time, as the other input "j" of the look-up table ②', an image including the background, stopped objects, objects moving at a low speed, and objects moving at a middle speed (Background+Stopped+Low speed+Middle speed) is input. In this case, this image has been output from a look-up table ④ that will be hereinafter described. The look-up table ②' is implemented in a manner similar to the case of the look-up table ② shown in FIG. 5(B). Therefore, if a value of |i−j| is equal to or larger than a threshold value th2 (|i−j|≧th2), the look-up table ②' outputs the value of |i−j| as an output "k".

With respect to the image portion corresponding to the background and the objects moving at a low speed, since a value of one input "i" is equal to a value of the other input "j", a value of the output "k" from the look-up table ②' is zero (k=0). Therefore, with regard to the output "k" of the look-up table ②', the value of |i−j| produces an output only in those portions of the image where objects moving at a middle speed exist (Middle speed), and then this image is input to a look-up table ①' as one input "i".

At this time, as the other input "j" of the look-up table ①', an input image, which is captured by the image-input means 1, is input. This input image includes the background, stopped objects, objects moving at a low speed, objects moving at a middle speed, and objects moving at a high speed. Therefore, the value of |i−j| is input to the look-up table ①' produces an output only in a portion of the image where objects moving at a middle speed exist (Middle speed).

In this case, the look-up table ①' is constructed to operate in a manner similar to the case of look-up table ①. Therefore, with regard to the output "k" of the look-up table ①', only objects moving at a middle speed are extracted from the input image (middle speed).

Further, in FIGS. 5(A) and 5(B), an input image, which is taken by an image-input means 1, is also input to a look-up table ④ in a second average background extract unit 4, as one input "i". On the other hand, an image, which has been stored in a third image memory 4-1, is also input to the look-up table ④ as the other input "j". In this case, if a value of one input "i" of the look-up table ④ is equal to a value of the other input "j" thereof, the same image as that stored in the image memory 3-1 is directly output from the look-up table ④, and then stored again in the image memory 4-1.

Further, if a value of (i−j) is in the range from zero through th41 (for example, th41=10; 0≦(i−j)≦th31), a value, which is obtained by adding an offset value α41 (for example, α41=1) to a value of the other input "j", is output from the look-up table ④. At the same time, the thus obtained value is also stored in the image memory 4-1. If a value of (j−i) is in the range from zero through th41 (0≦(j−i)≦th41), a value, which is obtained by subtracting an offset value α42 from a value of the other input "j", is output from the look-up table ④. At the same time, the thus obtained value is also stored in the image memory 4-1. Further, if a value of (i−j) is larger than a threshold value th41 and equal to or smaller than a threshold value th42 (for example, th42=255; th41 <(i−j)≦th42), a value, which is obtained by adding an offset value α42 (for example, α42=10) to a value of the other input "j", is output from the look-up table ④. At the same time, the thus obtained value is stored in the image memory 4-1.

In this way, the value of an output "k" in output from the look-up table ④ is a portion of the image including the background, stopped objects, objects moving at a low speed, and also objects moving at a middle exist (Background+Stop+Low speed+Middle speed). The reason why an output "k" outputs such image portions including objects moving at a middle speed will be hereinafter described. The output "k" from the look-up table ④ is input to the look-up tables ②' as the other input "j", and also input to a look-up table ②" in a third difference-calculation processing unit 7, as one input "i".

At this time, as the other input "j" of the look-up table ②", an input image, which is captured by the image-input means 1, is input. The input image includes the background, stopped objects, objects moving at a low speed, objects moving at a middle speed, and objects moving at a high speed. The look-up table ②" is implemented in a manner similar to the case of the look-up table ② shown in FIG. 5(B). Therefore, if a value of |i−j| is equal to or larger than a threshold value th2 (|i−j|≧th2), the look-up table ②" outputs the value of |i−j| as an output "k".

With respect to the image portion corresponding to the background, the objects moving at a low speed, and the objects moving at a middle speed, since a value of one input "i" is equal to a value of the other input "j", a value of the output "k" from the look-up table ①" is zero (k=0). Therefore, with respect to the output "k" of the look-up table ②", the value of |i−j| produces an output only in those portions of the image where objects moving at a high speed exit (High speed), and then this image is input to a look-up table ①" as one input "i".

At this time, as the other input "j" of the look-up table ①", an input image, which is captured by the image-input means 1, is input. This input image includes the background, stopped objects, objects moving at a low speed, objects moving at a middle speed, and objects moving at a high speed. Therefore, the value of |i−j| input to the look-up tables ① produces an output only in a portion of the image where objects moving at a high speed exit (High speed).

In the above-mentioned embodiment, plural images are generated on the basis of plural reference speeds, and plural types of objects are individually extracted from an original image based on the speed ranges. Therefore, it becomes possible to reduce the number of the objects which are to be supervised and processed, for example, to those objects having a low speed. All others are filtered out.

A detailed description will now be given regarding why an offset value is added to an output of the look-up tables ③ and ④, or substracted from the output of these look-up tables, to modify and store data in the image memories 3-1 and 3-2.

When there is a difference between the data stored in each of these image memories and an input image which is larger than a predetermined threshold value, the data in each of these image memories are modified by adding or substracting the offset value to or from the input image.

When the movement of an extracted object is slow, the data in the image memories can be modified before the object moves outside a region of an original or first image in which the object appears.

In such a situation, it is possible to make the data stored and output by the image memories conform to the input image, by frequently modifying the data with a relatively small offset value.

However, when the movement of an extracted object is fast, the object can move outside a region of an original or first image in which the object appears in a short time and finally disappear. To address this problem, it is necessary to modify the data with a relatively large offset value because the number of times available for opportunities for modification is reduced.

Namely, in detecting an object moving at a high speed, the offset value is set to a large value, and the data in the image memories are intended to be rapidly modified. On the other hand, in detecting an object moving at a low speed, the offset value is set to a small value, and the data in the image memories are intended to be modified for a longer period of time. In such an approach, the offset value is changed in accordance with the speed of the moving object to be processed. Therefore, even when there are a lot of moving objects to be processed, the difference in speeds between these moving objects can be easily discriminated, and all the necessary objects can be distinguished from each other.

Figure 6A:
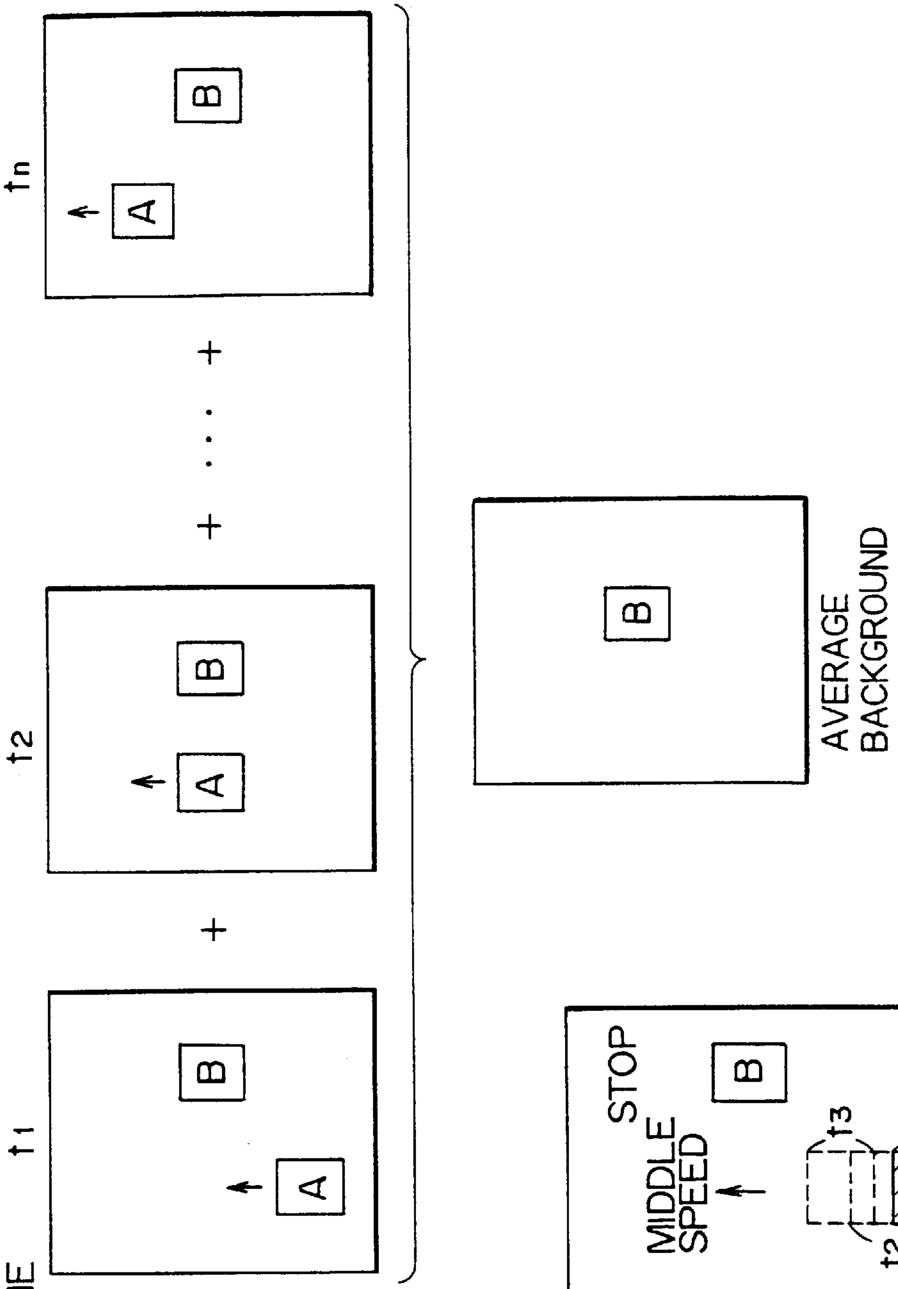
FIGS. 6(A) and 6(B) are diagrams for explaining another example in which plural images are respectively extracted in a first preferred embodiment of the present invention.
Figure 6B:
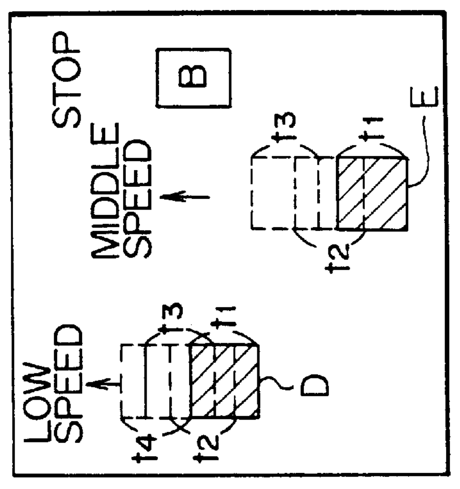

FIGS. 6(A) and 6(B) are diagrams for explaining another example in which images containing objects moving at different speeds are respectively extracted in a first preferred embodiment of the present invention.

More specifically, FIG. 6(A) illustrates a plurality of images which are captured during a sampling time period; and FIG. 6(B) illustrates an image in which a plurality of moving objects have been classified into several groups on the basis of different speeds.

As shown in FIG. 6(A), it is assumed that both a moving object A moving in the direction indicated by arrows and a stopped object B exist in the scene/image. In each image captured at sampling times $t_1$, $t_2$, . . . $t_n$, the moving object A and the stopped object B are positioned as indicated in the upper part of FIG. 6(A). All the images are respectively stored in memories (not shown) and accumulated. Further, the thus accumulated images are averaged, and an average background is calculated.

In this case, a stopped object B can be extracted with a value which is obtained by accumulating the above-mentioned images of the number of n and averaging the thus accumulated images. Namely, since the stopped object B does not change position at each sampling time $t_1, t_2, \ldots t_n$, the stopped object B can be easily extracted from the average background as shown in the lower part of FIG. 6(A).

On the other hand, with respect to the moving object A, especially in a case where the movement of the moving object A is fast, a plurality of moving objects A exist in the respective images at corresponding sampling times $t_1, t_2, \ldots t_n$ that do not overlap with each other. By carrying out an averaging process, one moving object A positioned at a certain sampling time $t_1$ and a plurality of backgrounds including the object at different positions of the number of (n−1) at sampling time $t_2 \ldots t_n$ are averaged together. Therefore, an image density value of a moving object A in such an averaged image is extremely small. More specifically, the density value of the moving object A is smaller than a threshold value, and consequently when the averaged image compared or tested against the threshold the moving object A disappears from the average background. As a result, the stopped object B remains in the average background, while the moving object A appears not to exist in the average background.

In this case, the image only including the moving object A can be easily extracted by calculating a difference between the average background and each image at each sampling time $t_1, t_2, \ldots t_n$.

Further, as shown in FIG. 6(B), where a moving object D moving at a low speed and a moving object E moving at a middle speed exist, as well as the stopped object B, these moving objects D, E can be distinguished from each other.

The location of the moving object D moving at a low speed at sampling time $t_2$, $t_3$ partially overlaps with a location of moving object D at the first sampling time $t_1$. However, the moving object D at the fourth sampling time $t_4$ does not overlap with the location of the moving object D at the first sampling time $t_1$.

Further, a moving object E moving at a middle speed at a second sampling time $t_2$ partially overlaps with the location of moving object E at the first sampling time $t_1$. However, the location of moving object E at the third sampling time $t_3$ does not overlap with the location of moving object E at the first sampling time $t_1$.

Therefore, if two images at sampling time $t_1$, $t_4$ are accumulated and divided by two, the density value of the moving object D moving at a low speed, the moving object E moving at a middle speed and the moving object A becomes smaller than a threshold value in the thus divided image. Therefore, in this way only the stopped object B can be extracted. That is, the stopped object can be isolated.

Further, if two images at sampling time $t_1$, $t_2$ and $t_3$ are accumulated and divided by three, the density value of the moving object E moving at a middle speed becomes smaller than a threshold value in the thus divided image. However, as described above, the object D moving at a low speed at sampling times $t_2$, $t_3$ partially overlaps with the object D at a first sampling time $t_1$ and consequently the moving object D can be extracted. At this time, the stopped object B also can be extracted, simultaneously with the moving object D. In this case, by subtracting the former image obtained on the basis of the two images captured at sampling times $t_1$, $t_4$ from the latter image obtained on the basis of the three images captured at sampling times $t_1$, $t_2$ and $t_3$, the moving object D can be finally distinguished from the other objects B, E.

Further, if the stopped object B and the moving object D moving at a low speed are eliminated from an original input image, the moving object E at a middle speed can be isolated and extracted.

By using the above technique, it is possible to accurately extract all the objects in an original input image, even in a case where moving objects exist in the images each having a speed higher than the middle speed. In this case, it should be noted that a background can be extracted, together with the stopped object B.

In such an implementation, by utilizing a technique different from that in FIG. 5(A), it becomes possible to output an image corresponding to a sum of a background, stopped objects, and objects moving at a low speed (Background+Stop+Low speed) from a first average background extract unit. Also, it becomes possible to output an image corresponding to a sum of a background, stopped objects, objects moving at a low speed, and objects moving at a middle speed (Background++Stop+Low speed+Middle speed) from a second average background extract unit.

In a first difference-calculation processing unit, on the basis of these images, it is possible to calculate a difference between a background output from a background image extract unit and the image containing objects moving at a low speed which is output from the first average background extract unit. Consequently, a portion of an image including stopped objects, and objects moving at a low speed can be obtained from the first difference-calculation processing unit.

Further, in a second difference-calculation processing unit, it is possible to calculate a difference between the image output from the first average background extract unit and the image output from the second average background extract unit. Consequently, a portion of an image including objects moving at a middle speed can be obtained from the second difference-calculation processing unit.

Further, in a third difference-calculation processing unit, it is possible to calculate a difference between the image output from the second average background extract unit and an original input image. Consequently, a portion of an image including objects moving at a high speed can be obtained from the third difference-calculation processing unit.

For example, in FIG. 1 again, it is assumed that the first average background extract unit 3 only extracts a background, stopped objects (including obstacles), and objects moving at a low speed. Also, it is assumed that the second average background extract unit 4 only extracts a background, stopped objects, objects moving at a low speed, and objects moving at a middle speed. In such a case, an image "c" is obtained from the first average background extract unit 3, while an image "d" is obtained from the second average background extract unit 4.

As a result, an image "e" only including the stopped objects and the objects moving at a low speed is obtained from the first difference-calculation processing unit 5. Further, an image "f" only including the objects moving at a middle speed is obtained from the second difference-calculation processing unit 6. Further, an image leg "g" only including the objects moving at a high speed is obtained from the third difference-calculation processing unit 7.

However, it should be noted that there is no moving object at a high speed in the example shown in FIG. 1.

In this case, nothing appears in the image "g". Therefore, in the case where nothing appears in the three images "e", "f" and "g", an original input image is stored in the background image extract unit 2.

Further, with reference to FIG. 2 again, each of a first local-area characteristic-amount extract unit 8, a second local-area characteristic-amount extract unit 9, and an N+1-th local-area characteristic-amount extract units 10 have the same construction. Therefore, the construction of the first local-area characteristic-amount extract unit 8 which calculates object parameters such as center of gravity, length, circumference, etc. will be representatively described with reference to FIG. 7 described in detail hereinafter.

Figure 7:
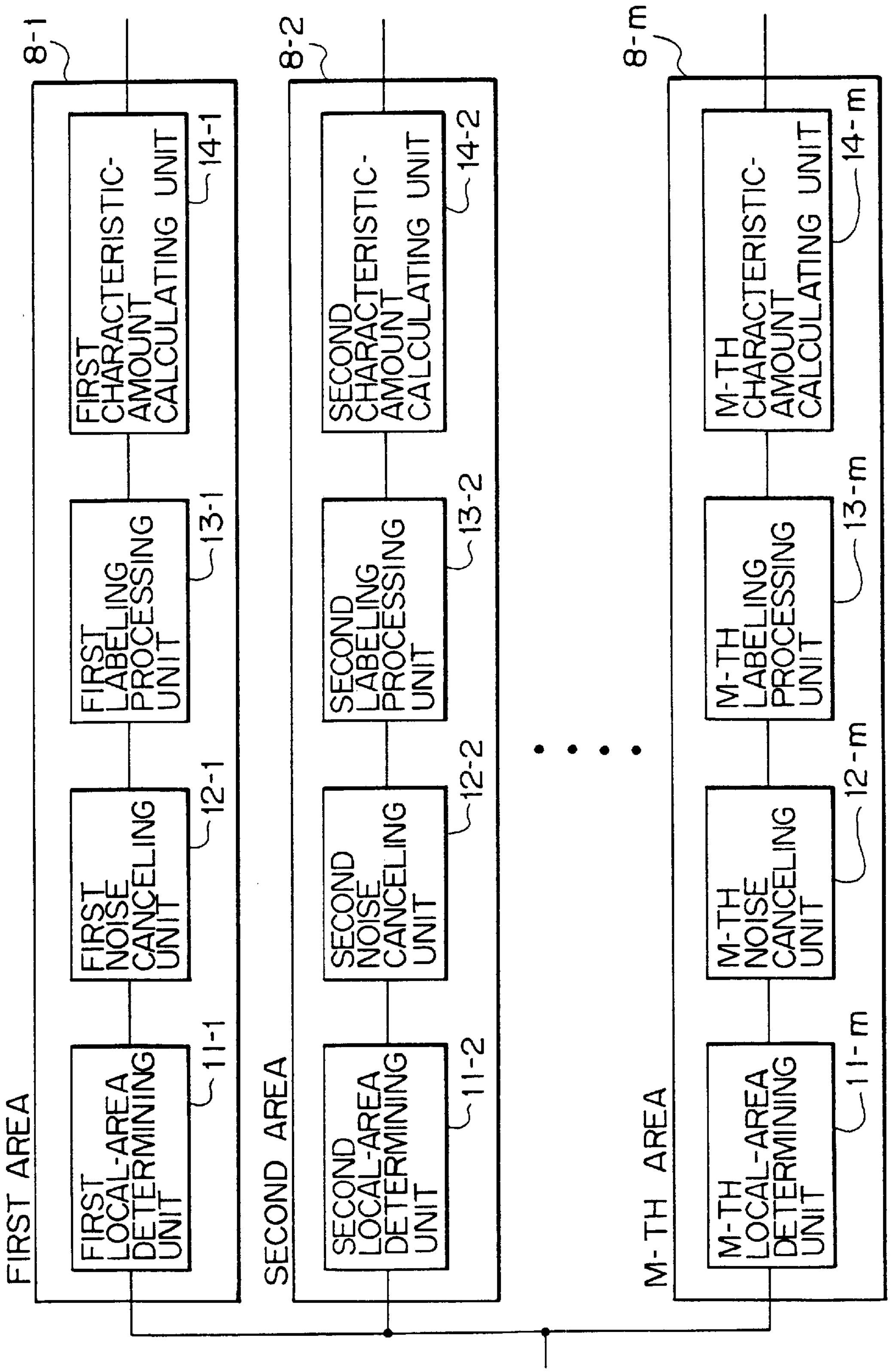
FIG. 7 is a block diagram showing the construction of local-area characteristic-amount extraction units in a first preferred embodiment of the present invention.

FIG. 7, is a block diagram showing the construction of the first local-area characteristic-amount extract unit in a first preferred embodiment of the present invention.

In FIG. 7, an area of the whole input image (the entire captured image), which is taken or captured by an image-input unit 1, is allocated (or divided) in advance into a plurality of local areas.

For example, as shown in FIG. 4 mentioned previously, a plurality of local areas L0 to L4 are established as local areas which are used to trace cars moving in the traffic lane on the left side L. On the other hand, a plurality of local areas R0 to R4 are established as local areas which are used to trace cars moving in the traffic lane on the right side R.

Further, for these local areas, a plurality of local area extract processing units 8-1, 8-2, . . . 8-m ("m" denotes any natural number more than 2) respectively are provided. For example, in FIG. 4, local areas L0 to L4 and local areas R0 to R4 are provided on the left side L and the right side R, respectively. Therefore, in this case, it becomes necessary to provide ten local area extract processing units (m=10).

Further, for a first local area in FIG. 7, a first local area extract processing unit 8-1 includes a first local-area determining unit 11-1, a first noise canceling unit 12-1, a first labeling processing unit 13-1, and a first characteristic-amount calculation unit 14-1.

More specifically, the first local-area determining unit 11-1 defines one of the local areas which must be processed by the first local area extract processing unit 8-1. For example, in the case where the first local-area determining unit 11-1 is to process a local area L0, the first local-area determining unit 11-1 defines the range of the local area L0 and extracts a portion of the input image within this range. The first noise canceling unit 12-1 eliminates noise from a signal which is sent from the first local-area determining unit 11-1. Typically, the noise canceling unit 12-1 is implemented by a low pass filter.

The first labeling processing unit 13-1 carries out a labeling process. The labeling process is executed to provide the same label to each of the same objects with respect to input images generated in time series in the given local area.

The first characteristic-amount calculation unit 14-1 checks to determine whether the thus labeled area exists. If a plurality of the thus labeled area actually exist, the first characteristic-amount calculation unit 14-1 produces a projection for each of the labeled areas, and further calculates a position of the "center-of-gravity" in each of the labeled areas, the value of the length and breadth of each of the labeled areas, and the value of an area (space) in each of the labeled areas. Namely, the first characteristic-amount calculation unit 14-1 estimates a plurality of characteristic-amounts or object parameters for each of the labeled areas that can be used to identify and track objects.

In a similar manner, the other local area extract processing units 8-2 . . . 8-m respectively include the corresponding local-area determining units 11-2 . . . 11-m, the corresponding noise canceling units 12-2 . . . 12-m, the corresponding labeling processing unit 13-2 . . . 13-m, and the corresponding characteristic-amount calculation unit 14-2 . . . 14-m.

FIGS. 8(A) to 8(F) are diagrams for explaining operations of a first preferred embodiment of the present invention in a case where a plurality of stationary objects (e.g., a stopped car and an obstacle exist in the same series of images) and a plurality of moving objects exist together.

Figure 8A:
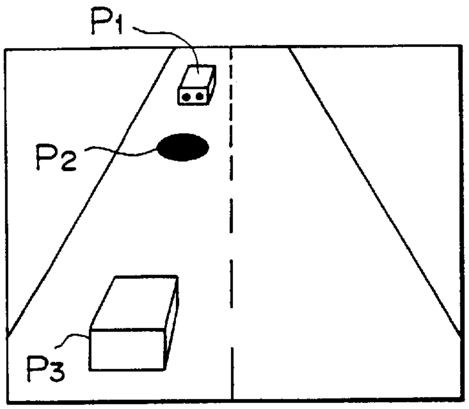
FIGS. 8(A) to 8(F) are diagrams for explaining operations of a first preferred embodiment of the present invention in the case where a plurality of stationary objects and a plurality of objects moving at a low speed exist together.

In FIG. 8(A), it is assumed that there are a stopped car $P_1$ which has tail lamps flashing, an obstacle $P_2$, and a low speed car $P_3$, at a certain sampling time "t", to simplify the explanation. In this case, an output from the first difference-calculation processing unit 5 is indicated by an image shown in FIG. 8(C). In this image, all the objects including the obstacle $P_2$ are extracted. When this image and the local areas in FIG. 4 are overlapped with each other, an image as shown in FIG. 8(E) is obtained. In FIG. 8(E), cars exist in a portion of the local areas L1, L2 and L4. Therefore, characteristic-amounts or object parameters can be calculated for the three local areas.

Figure 8B:
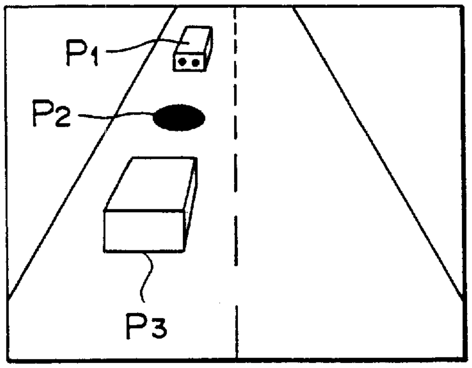
Figure 8C:
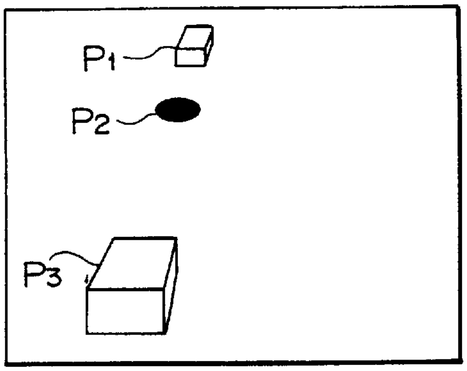
Figure 8D:
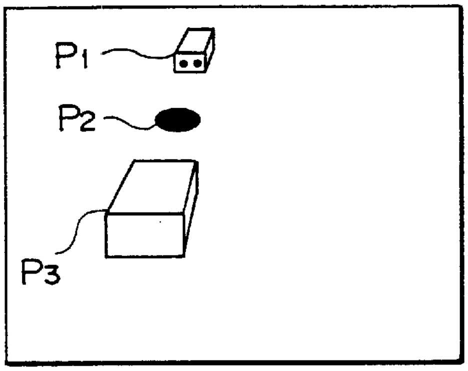
Figure 8E:
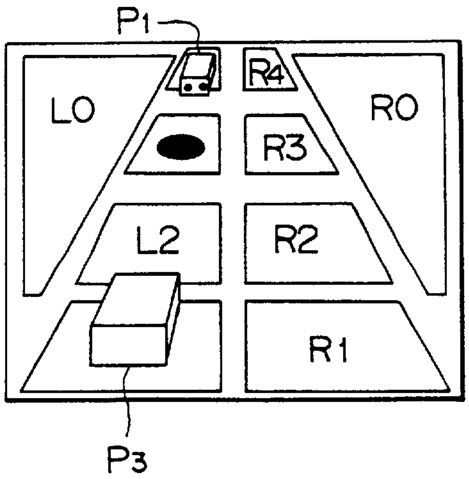
Figure 8F:
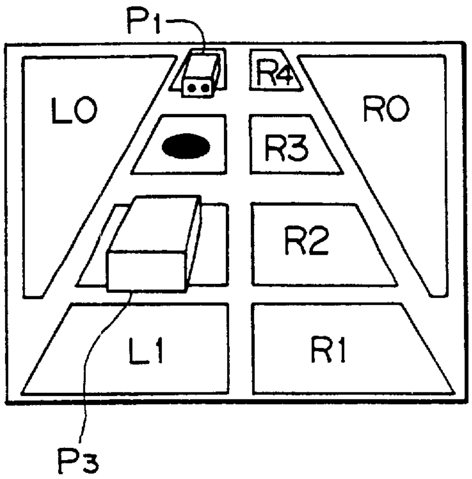

An image as shown in FIG. 8(A) changes to another image as shown in FIG. 8(B) at the sampling time when several seconds have elapsed after the sampling time "t" (i.e., sampling time "t+several seconds"). That is, the images of 8(A) and 8(B) are captured with a sampling interval of several seconds between them. Further, an output from the first difference-calculation processing unit 5 is indicated by the image shown in FIG. 8(D). When this image and the local areas in FIG. 4 overlap with each other, similar to the case of FIG. 8(C), an image as shown in FIG. 8(F) is obtained. In FIG. 8(F), cars exist in the local areas L2 and L4. Therefore, characteristic-amounts can be also calculated in these two local areas.

The characteristics or parameter extraction is processed in a time series and used by a list making unit 20-2 in a locus calculation unit 20 of FIG. 2, and a list is created by the list making unit 20-2. An example of the list is shown in the following table 1. Each of the circles (○) in the table 1 indicates that characteristic-amounts, such as the center-of-gravity, can be or are obtained at each corresponding sampling time; namely, any object (including an obstacle) exists at the given time in the area. The list is used to track the location or locus of an object by the list analyzing unit 20-3. In this case, as is apparent from FIG. 8, a stopped car $P_1$, an obstacle $P_2$, and a low speed car $P_3$ should be detected in the locus calculation unit 20.

TABLE 1

| | Stop + Low speed | | | | | | | | | |
|---|---|---|---|---|---|---|---|---|---|---|
| | L0 | L1 | L2 | L3 | L4 | R0 | R1 | R2 | R3 | R4 |
| TIME t | | ○ | | ○ | ○ | | | | | |
| t 1 | | ○ | | ○ | ○ | | | | | |
| t 2 | | ○ | | ○ | | | | | | |
| t 3 | | ○ | | ○ | | | | | | |
| t 4 | | ○ | ○ | ○ | ○ | | | | | |
| t 5 | | ○ | ○ | ○ | | | | | | |
| t 6 | | ○ | ○ | ○ | ○ | | | | | |
| t 7 | | ○ | ○ | ○ | | | | | | |
| t 8 | | | ○ | ○ | ○ | | | | | |
| . | | | . | | | | | . | | |
| . | | | . | | | | | . | | |
| . | | | . | | | | | . | | |
| t + SEVERAL SECONDS | ○ | ○ | ○ | | | | | | | |

FIGS. 9(A) to 9(F) are diagrams for explaining operations of a preferred embodiment of the present invention in the case where a plurality of moving objects moving at a middle speed exist.

In FIGS. 9(A) to 9(F), speed range images, extraction images, and the condition in which two different images overlap with each other, are illustrated at sampling time "t" and "t+several seconds", respectively, in the case where middle speed cars exist in the images.

The result of characteristic or object parameter processing obtained from FIGS. 9(A) to 9(F) is also processed in a time series and used by the list making unit 20-2, and a list is created. An example of the list is shown in the following table 2.

TABLE 2

| Middle speed | L0 | L1 | L2 | L3 | L4 | R0 | R1 | R2 | R3 | R4 |
|---|---|---|---|---|---|---|---|---|---|---|
| TIME t | | | | | | | ○ | | | ○ |
| t 1 | | | | | | | ○ | | | ○ |
| t 2 | | | | | | | ○ | | | |
| t 3 | | | | | | | ○ | ○ | | |
| t 4 | | | | | | | ○ | | | |
| t 5 | | | | | | | ○ | | | |
| t 6 | | | | | | | ○ | | | |
| t 7 | | | | | | | ○ | | | |
| t 8 | | | | | | | ○ | | | |
| . | | | . | | | | | . | | |
| . | | | . | | | | | . | | |
| . | | | . | | | | | . | | |
| t + SEVERAL SECONDS | | | | | | | | | | ○ |

FIGS. 10(A) to 10(F) are diagrams for explaining operations of a preferred embodiment of the present invention in the case where a plurality of objects moving at a high speed may exist.

However, in this case, a high speed car does not exist in the images. Therefore, in FIGS. 10(A) to 10(F), a high speed car is not illustrated. Also, in a table 3 corresponding to these figures, a circle is not inserted as shown below.

TABLE 3

| High speed | L0 | L1 | L2 | L3 | L4 | R0 | R1 | R2 | R3 | R4 |
|---|---|---|---|---|---|---|---|---|---|---|
| TIME t | | | | | | | | | | |
| t 2 | | | | | | | | | | |
| t 3 | | | | | | | | | | |
| t 4 | | | | | | | | | | |
| t 5 | | | | | | | | | | |
| t 6 | | | | | | | | | | |
| t 7 | | | | | | | | | | |
| t 8 | | | | | | | | | | |
| . | | | | . | | | | | . | |
| . | | | | . | | | | | . | |
| . | | | | . | | | | | . | |
| t + SEVERAL SECONDS | | | | | | | | | | |

In this case, a list analyzing unit 20-3 in a locus calculation unit 20 of FIG. 2 analyzes the content of the table 3. Consequently, it is determined that a high speed car moving at a high speed does not exist in both of the traffic lines.

Further, by an analysis of the table 2 mentioned previously, it can be determined that there are no circles in the local area on the left side (L0 to L4) , and therefore a car moving at a middle speed does not exist in the traffic line on the left side at that time. Further, at the sampling time "t" and "t1", there are circles in two local areas on the right side (R1 and R4) . Therefore, it is discriminated or determined that two cars moving at a middle speed exist in the traffic line on the right side at that time.

Also, in the table 2, at the sampling time "t3", there are circles in adjoining local areas on the right side (R1 and R2). Further, at the next sampling time "t4", there is only one circle in a local area R2. Therefore, it can be discriminated or determined that an object (car) existing in the local area R1 and an object (car) existing in the local area R2 at the sampling time "t3" are related to the same object.

Further, the table 1 mentioned before is rather complicated and difficult to analyze. However, on the basis of the table 1, the below-mentioned facts can be discriminated or determined.

First, there is no circle in the local areas on the right side (R0 to R4), and therefore a stopped car or a low speed car does not exist in the traffic lane on the right side at that time.

Second, there are circles in the local areas on the left side (L1 to L4), and therefore a stopped car or a low speed car exists in the traffic line on the left side at that time.

In this case, circles appear and disappear at regular intervals in the local area L4. Therefore, it can be presumed that a stationary object exists in the adjoining local area L3. In the table 1, circles exist in the local area L1 at the sampling time from "t" to "t3". Further, circles exist in the local areas L1 and L2 at the sampling time from "t4" to "t7". Further, circles exist in the local area L 2 after the sampling time "t8". On the basis of the changes in the location of circles in the time series, it is discriminated or determined that a moving object at a low speed exists.

Heretofore, the above-mentioned analyzing process is carried out by discriminating whether an object exists in local areas, with the relationship between time and position being taken into consideration.

However, in addition to such an analyzing process, the value of a length and breadth of the object or the value of an area of the object can be utilized as a characteristic-amount or parameter. By virtue of these characteristic-amounts or object parameters, it becomes possible to extract a great deal of information.

A table 4 illustrates an example in which a car executing a change of the traffic lane is detected. The change of the traffic lane can be easily discriminated or detected by tracing the movement of circles in the table 4 on the basis of the above-mentioned description. An object, which has existed in a local area until a given time, instantaneously disappears. However, at that time when the object disappears from one local area, another object appears in another local area, particularly in the adjoining local area. In this case, it is discriminated or determined that the object disappeared before is a car executing a change of the traffic lane.

TABLE 4

| Change of traffic lane | L0 | L1 | L2 | L3 | L4 | R0 | R1 | R2 | R3 | R4 |
|---|---|---|---|---|---|---|---|---|---|---|
| TIME t | | | | | | | | | | |
| t 1 | | ○ | | | | | | | | |
| t 2 | | ○ | | | | | | | | |
| t 3 | | ○ | | | | | | | | |
| t 4 | | ○ | ○ | | | | | ○ | | |
| t 5 | | | | | | | | ○ | | |
| t 6 | | | | | | | | ○ | | |
| t 7 | | | | | | | | ○ | | |
| t 8 | | | | | | | | ○ | ○ | |
| t 9 | | | | | | | | | ○ | |
| t 10 | | | | | | | | | ○ | |
| t 11 | | | | | | | | | ○ | |
| t 12 | | | | | | | | | ○ | ○ |
| . | | | . | | | | | . | | |
| . | | | . | | | | | . | | |
| . | | | | | | | | | | |

In the table 4, circles have existed in the local area L1 until the time corresponding to the sampling time from "t3". Further, at the sampling time "t4", circles appear to the three local areas L1, L2 and R2. Subsequently, at the sampling time from "t5", "t6" and "t7", circles exist in the local area R2. Therefore, it is easily discriminated or determined that the object executes a change of the traffic lane from the left side to the right side.

In this case, if the time necessary for the movement of the object and the size of each of the local areas can be obtained, a speed of the object can be also calculated. For example, when the value of a distance length of a certain local area is defined as L, and the value of the length of time in which the object is positioned in the local area is defined as T, a speed of the object can be calculated by a calculation of L/T.

Figure 11A:
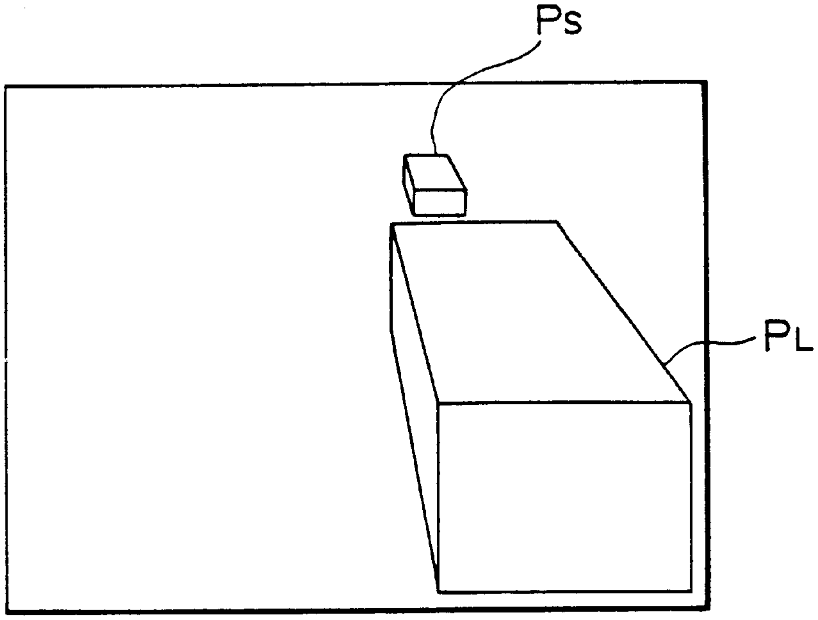
FIGS. 11(A) and 11(B) are diagrams for explaining operations of a first preferred embodiment of the present invention in the case where a large-scale car and a small-scale car exist together.
Figure 11B:
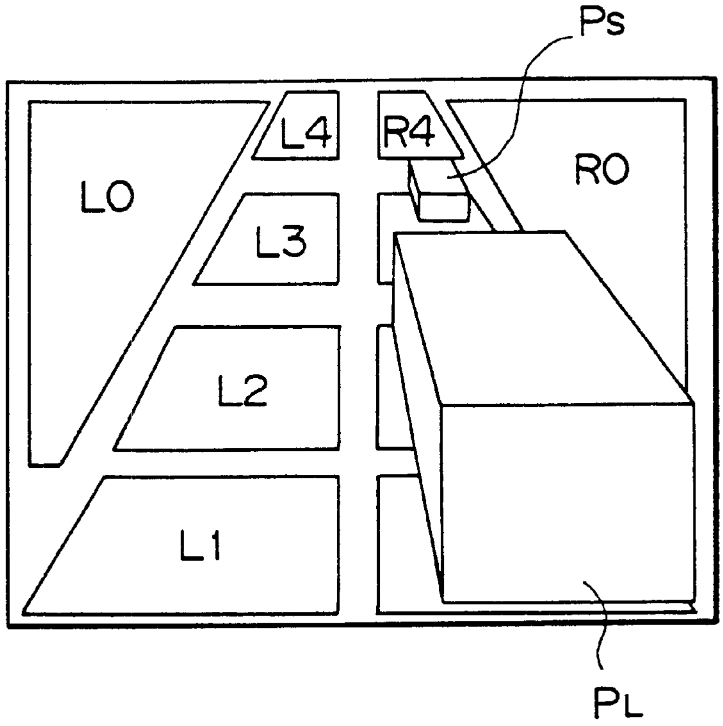

FIGS. 11(A) and 11(B) are diagrams for explaining operations of a first preferred embodiment of the present invention in a case where a large-scale car and a small-scale car exist together in the image.

In FIG. 11(A), an image, in which both a large-scale car $P_L$ and a small-scale car $P_s$ move in the traffic lane on the right side, is illustrated. Further, when this image and a plurality of local areas shown in FIG. 4 overlap with each other, an image as shown in FIG. 11(B) is obtained.

In this case, the following table 5 is created when a large-scale car $P_L$ and a small-scale car $P_s$ exist in the same traffic lane.

TABLE 5

| | Large-scale car | | | | | | | | | |
|---|---|---|---|---|---|---|---|---|---|---|
| | L0 | L1 | L2 | L3 | L4 | R0 | R1 | R2 | R3 | R4 |
| TIME t | | | | | | | | | | |
| t 1 | | | | | | ○ | ○ | ○ | ○ | ○ |
| t 2 | | | | | | ○ | ○ | ○ | ○ | ○ |
| t 3 | | | | | | ○ | ○ | ○ | ○ | ○ |
| t 4 | | | | | | ○ | ○ | ○ | ○ | |
| t 5 | | | | | | ○ | | ○ | ○ | |
| t 6 | | | | | | ○ | | ○ | ○ | |
| t 7 | | | | | | ○ | | ○ | ○ | |
| t 8 | | | | | | ○ | | ○ | ○ | |
| t 9 | | | | | | ○ | | | ○ | |
| t 10 | | | | | | ○ | | | ○ | |
| t 11 | | | | | | ○ | | | ○ | |
| t 12 | | | | | | ○ | | | ○ | |
| . | | | . | | | | | . | | |
| . | | | . | | | | | . | | |

In the table 5, circles exist continuously in the local area R0 in accordance with the movement of a large-scale car. Therefore, an existence of a large-scale car can be easily detected or determined from such a pattern.

Further, in the table 5 and FIG. 11, at the sampling time "t4", a small-scale car $P_s$ moves outside the local area R4. Further, at the sampling time "t5", a large-scale car $P_L$ passes through the local area R1 and enters the other local area R2.

Further, with reference to the following table 6, the condition in which a large-scale car $P_L$ causes a small-scale car $P_s$ to go out of sight because the large scale car obscures the small scale car will be described.

TABLE 6

| | Condition in which a large-scale car puts a small-scale car out of sight | | | | | | | | | |
|---|---|---|---|---|---|---|---|---|---|---|
| | L0 | L1 | L2 | L3 | L4 | R0 | R1 | R2 | R3 | R4 |
| TIME t | | | | | | | | | | |
| t 1 | | | | | | ○ | ○ | | ○ | |
| t 2 | | | | | | ○ | ○ | | ○ | |
| t 3 | | | | | | ○ | ○ | | ○ | |
| t 4 | | | | | | ○ | | ○ | ○ | |
| t 5 | | | | | | ○ | | ○ | ○ | |
| t 6 | | | | | | ○ | | ○ | ○ | |

TABLE 6-continued

| | Condition in which a large-scale car puts a small-scale car out of sight | | | | | | | | | |
|---|---|---|---|---|---|---|---|---|---|---|
| | L0 | L1 | L2 | L3 | L4 | R0 | R1 | R2 | R3 | R4 |
| t 7 | | | | | | ○ | | | ○ | |
| t 8 | | | | | | ○ | | | ○ | |
| t 9 | | | | | | ○ | | | ○ | |
| t 10 | | | | | | ○ | | | ○ | |
| t 11 | | | | | | ○ | | | ○ | ○ |
| t 12 | | | | | | ○ | | | ○ | ○ |
| . | | | . | | | | | . | | |
| . | | | . | | | | | . | | |

In the table 6, at the sampling time "t1", a large-scale car moves into the local area R1, while the other car (for example, a small-scale car) moves into the local area R3. Further, at the sampling time "t4", the large-scale car moves into the local area R2. Further, at the sampling time "t7", the large-scale car moves into the local area R3. At this time, as is apparent from the table 6, the large-scale car puts out of sight or obscures the other car moving in front of the large-scale car.

In this case, at the sampling time "t11", the other car moves into the local area R4; namely, the other car appears again in front of the large-scale car. The change of condition can be discriminated by the list analyzing unit 20-3.

In the locus calculation unit 20, the character analyzing unit 20-1 analyzes a characteristic or parameter concerning the shape of the object, and discriminates the same moving object. On the basis of a result of this discrimination, the character analyzing unit 20-1 instructs the list making unit 20-2 to determine a locus of the same moving object. In this way, it becomes possible to easily obtain the locus of the same moving object.

FIGS. 12(A) to 12(E) are diagrams for explaining operations of a second preferred embodiment of the present invention in a case where a large-scale moving object and a small-scale moving object exist together in an airport.

In the second preferred embodiment shown in FIGS. 12(A) to 12(E), the case where an image processing apparatus of the present invention is applied to a spot supervisory system utilizing a view of a predetermined spot in an airport will be described.

In the second preferred embodiment, an attempt is made to distinguish a large-scale moving object moving at a low speed (for example, an airplane) from small-scale moving objects moving at a middle or high speed (for example, special cars used for various work such as baggage handling), and to examine attributes of the large-scale moving objects.

Figure 12A:
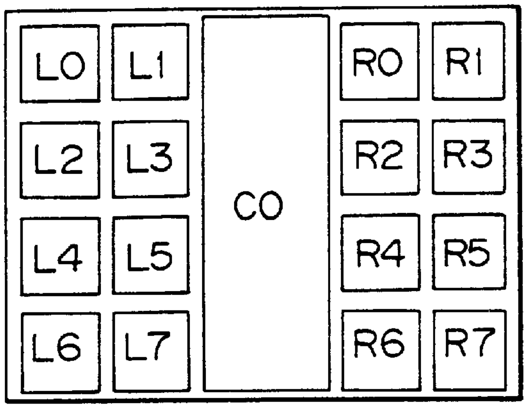
FIGS. 12(A) to 12(E) are diagrams for explaining operations of a second preferred embodiment of the present invention in the case where a large-scale moving object and a small-scale moving object exist together in an airport.

In this embodiment, a plurality of local areas C0, L0 to L7, and R0 to R7 are provided in a manner shown in FIG. 12(A). The local area C0 is intended to detect an airframe of the airplane. On the other hand, the other local areas L0 to L7, and R0 to R7 are intended to detect the other small-scale moving objects, e.g., the special cars.

Figure 12B:
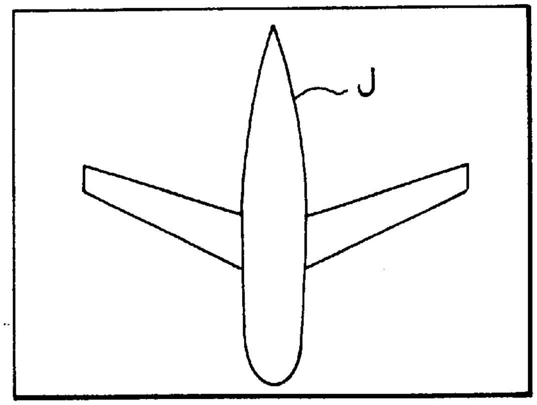
Figure 12C:
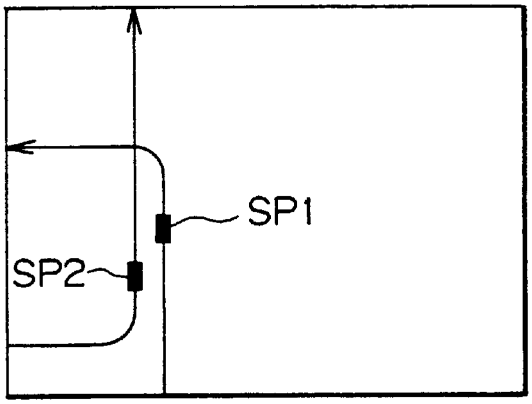

FIG. 12(B) shows a condition in which an airplane J stops in a spot; and FIG. 12(C) shows the condition in which a plurality of special cars SP1, SP2 move in various directions.

Figure 12D:
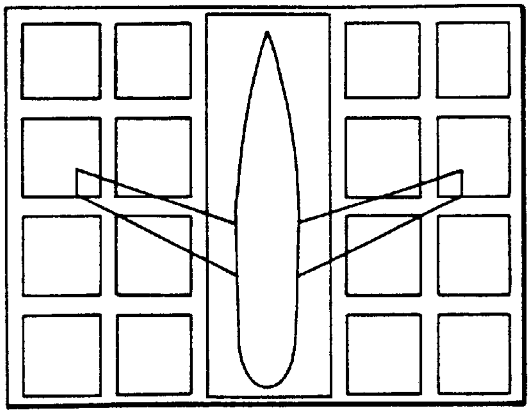
Figure 12E:
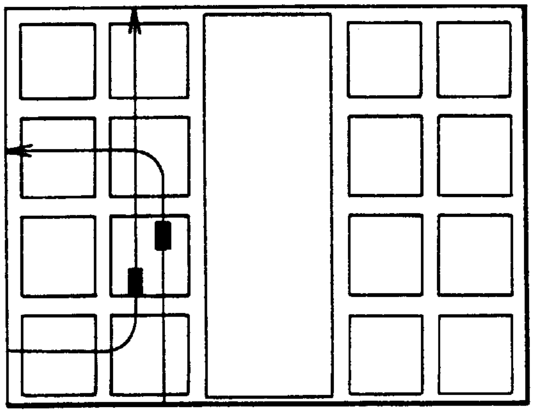

Further, FIGS. 12(D) and 12(E) show a situation in which an image in FIG. 12(B) and the local areas in FIG. 12(A) overlap with each other; and FIG. 12(E) shows the situation in which an image in FIG. 12(C) and the local areas in FIG. 12(A) overlap with each other.

When the airplane J comes close to the spot and decelerates, and finally stops, the airframe of the airplane J appears in the local area C0. Such a condition is detected by utilizing a technique for extracting a moving object moving at a low speed or stopped which has been described previously.

Figure 13A:
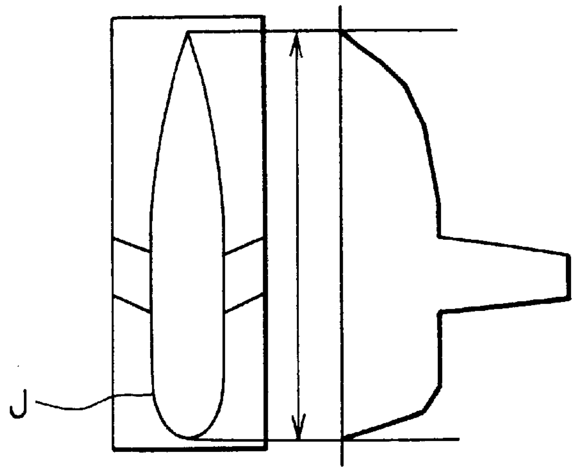
FIGS. 13(A) and 13(B) are diagrams for explaining a process of obtaining a projection of a large-scale moving object in a second preferred embodiment of the present invention.

In this case, as shown in FIG. 13(A), the value of a length of the airframe is calculated by producing a projection of the airplane J in a direction corresponding to the longer sides of the local area C0.

Namely, the value of a length of the airframe can be measured. Further, it becomes possible to identify a type of the airplane J on the basis of the measured length of the airframe. In the case where the airplane J comes close to the spot and stops, the value of a length of the airframe changes gradually changes as illustrated in the following table 7.

TABLE 7

| Length of airplane | |
|---|---|
| | LENGTH OF PROJECTION OF C0 |
| TIME t | 0 |
| t 1 | 5 0 |
| t 2 | 1 0 0 |
| t 3 | 1 5 0 |
| t 4 | 2 0 0 |
| t 5 | 2 0 0 |
| t 6 | 2 0 0 |
| t 7 | 2 0 0 |
| t 8 | 2 0 0 |

As apparent from the table 7, as time elapses over the sampling times "t1", "t2" and "t3", a length of a projection, i.e., the value of a projection increases. However, after a given time (in this case, at sampling time "t4"), the increase in the value of a projection stops. When an increase in the value of a projection stops and this value is stable, it is discriminated or determined that the airplane has completely stopped. Further, if a transformation equation is calculated in advance which establishes a relationship between the value of the projection and the value of an actual length, an actual length of the airplane can be accurately obtained. Consequently, in accordance with the actual length of the airplane, a type of the airplane can be determined.

In regard to the special cars SP1, SP1 shown in FIGS. 12(C) and 12(E), these cars are detected by utilizing a technique for extracting a moving object moving at middle and high speeds that has been previously described. Similar to the case of an airplane J, by calculating the value of a projection of each of these special cars, it becomes possible to detect the total number of the objects existing in the local area.

Figure 13B:
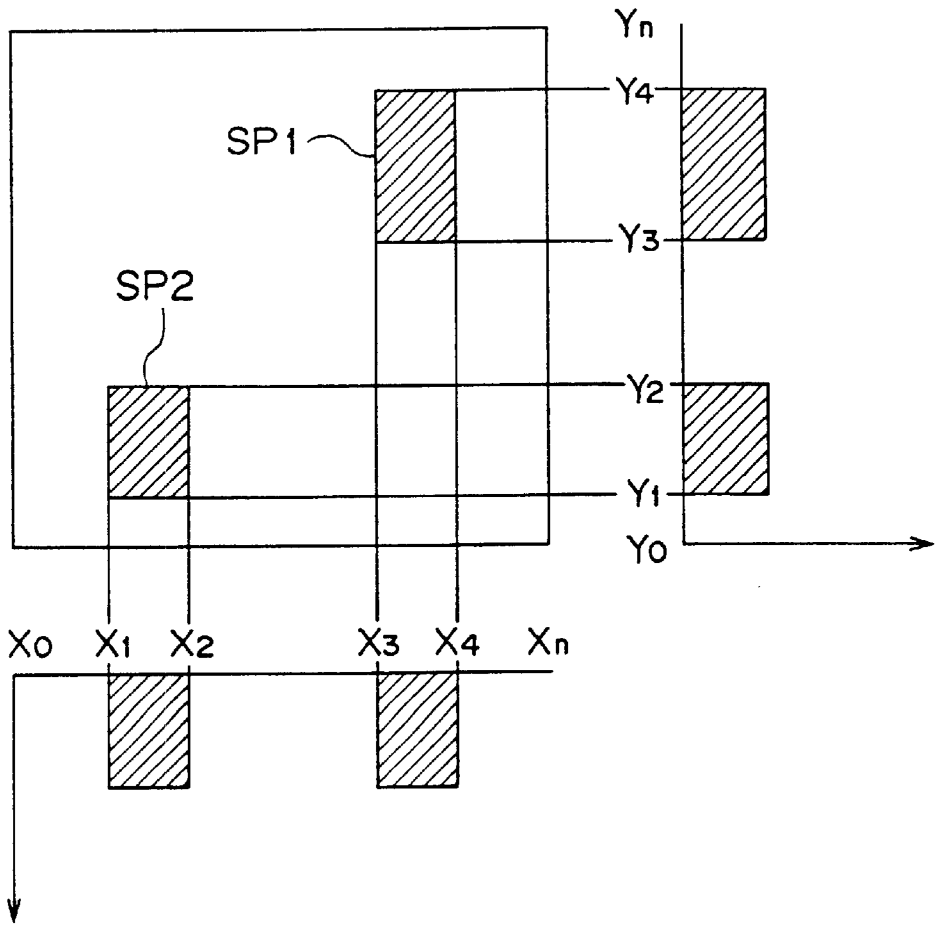

For example, in FIG. 12(E), the condition in which the value of a projection in the local area L5 is obtained will be illustrated in FIG. 13(B). As apparent from FIG. 13(B), two types of projections exist, the first in X direction ($X_0, X_1, \ldots X_n$) and the second in Y direction ($Y_0, Y_1, \ldots Y_n$), respectively. Therefore, it can be discriminated that two different objects independently exist in the local area.

In the case where special cars move as shown in FIG. 12(E), the number of these special cars detected in local area changes as illustrated in the following table 8.

TABLE 8

| | Number of objects | | | | | | | |
|---|---|---|---|---|---|---|---|---|
| | L0 | L1 | L2 | L3 | L4 | L5 | L6 | L7 |
| TIME t | — | — | — | — | — | — | — | 1 |
| t 1 | — | — | — | — | — | — | 1 | 1 |
| t 2 | — | — | — | — | — | — | 1 | 1 |
| t 3 | — | — | — | — | — | — | 1 | 1 |
| t 4 | — | — | — | — | — | — | 1 | 1 |
| t 5 | — | — | — | — | — | — | — | 2 |
| t 6 | — | — | — | — | — | — | — | 2 |
| t 7 | — | — | — | — | — | 1 | — | 1 |
| t 8 | — | — | — | — | — | 1 | — | 1 |
| t 9 | — | — | — | — | — | 2 | — | — |
| t 10 | — | — | — | — | — | 2 | — | — |
| t 11 | — | — | — | 1 | — | 1 | — | — |
| t 12 | — | — | — | 2 | — | — | — | — |
| t 13 | — | — | — | 2 | — | — | — | — |
| t 14 | — | 1 | — | 1 | — | — | — | — |
| t 15 | — | 1 | — | 1 | — | — | — | — |
| t 16 | — | 1 | — | 1 | — | — | — | — |
| t 17 | — | — | 1 | — | — | — | — | — |
| t 18 | — | — | 1 | — | — | — | — | — |
| t 19 | — | — | 1 | — | — | — | — | — |
| t 20 | — | — | 1 | — | — | — | — | — |

As is apparent from table 8, as the objects (special cars) move, the number of the objects existing in each local area changes. On the basis of the change in the number of the objects, it can be discriminated or determined that, at the sampling time "t5", a special car which had existed in the local area L6 moves to the local area L7, and the number of the objects in the local area L7 becomes two (2). Further, it is also discriminated or determined that, at the sampling time "t7", one of two special cars moving in the local area L7 moves to the local area L5. Further, it is discriminated that, at the sampling time "t9", the remaining one of the two special cars moves to the local area L5, and the number of the objects in the local area L5 becomes two (2) again.

Heretofore, a description has been given regarding the image processing apparatus of the present invention which is used in a tunnel or an airport. However, the present invention is not limited to these cases. Further, the various speeds of a plurality of moving objects have been classified into only three ranges (low speed, middle speed, and high speed). However, in this case, speeds of a plurality of moving objects are not limited to these three ranges. For example, it is possible for the speeds of the moving objects to be classified into plural speed range values, e.g., 0 to 30 km, 30 to 60 km, 60 to 90 km, 90 to 120 km, 120 to 150 km, and a speed value more than 150 km.

Figures 14A, 14B, 14C:
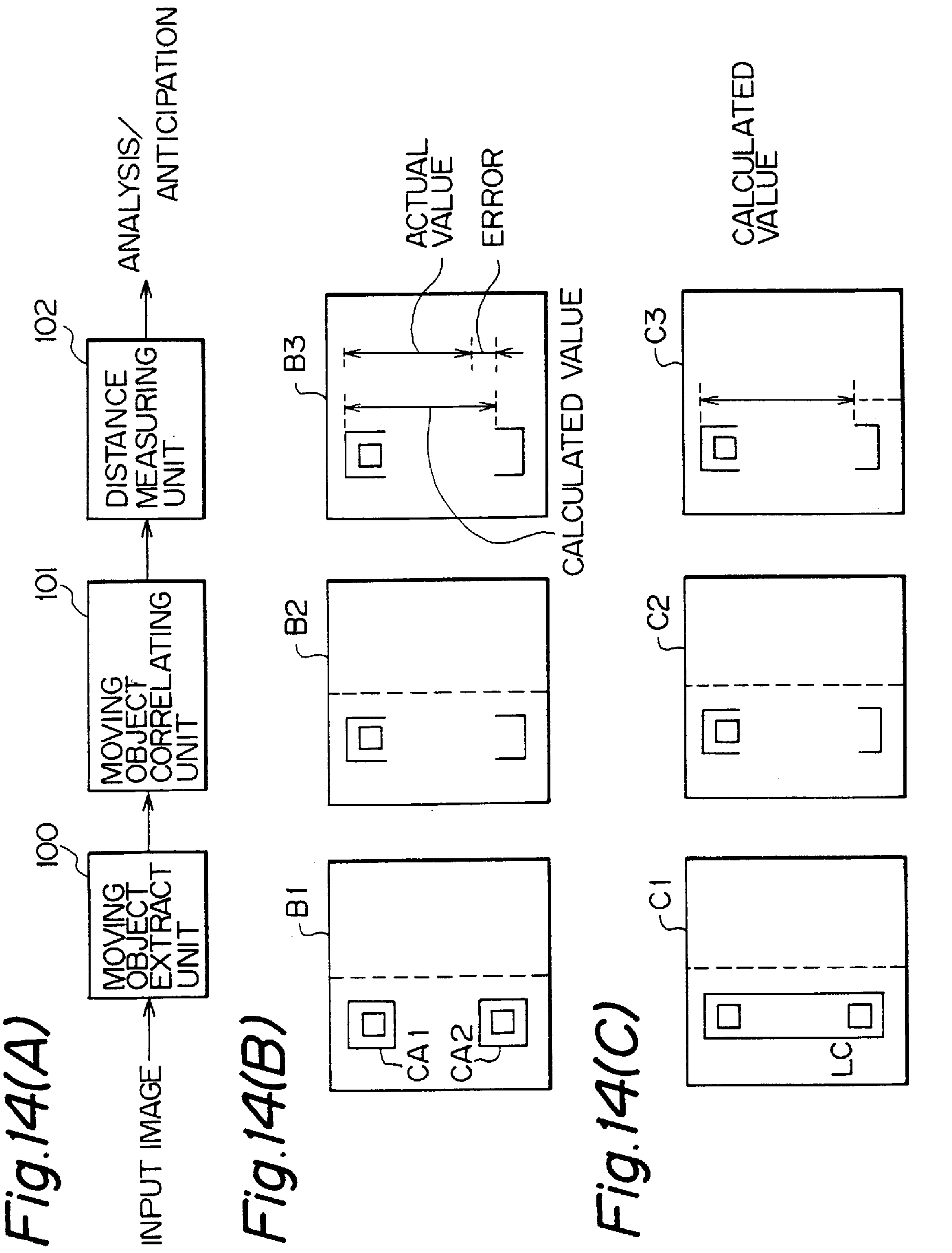
FIGS. 14(A) to 14(C) are diagrams for explaining a process of calculating a distance between two moving objects in a first preferred embodiment of the present invention.

FIGS. 14(A) to 14(C) are diagrams for explaining a process of calculating a distance between two moving objects in a first preferred embodiment of the present invention. In this case, a process of calculating a distance between two moving objects is assumed to be carried out only by the first preferred embodiment, to compare the first preferred embodiment with a third preferred embodiment that will be hereinafter described.

Figure 9A:
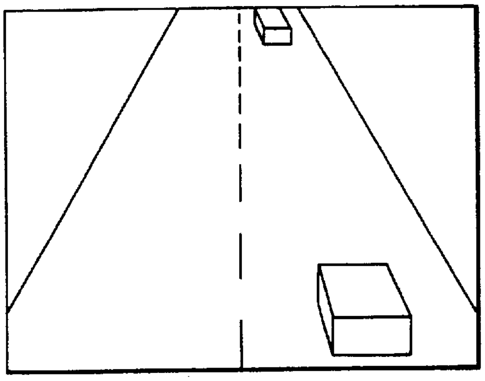
FIGS. 9(A) to 9(F) are diagrams for explaining operations of a first preferred embodiment of the present invention in the case where a plurality of objects moving at a middle speed exist.
Figure 9B:
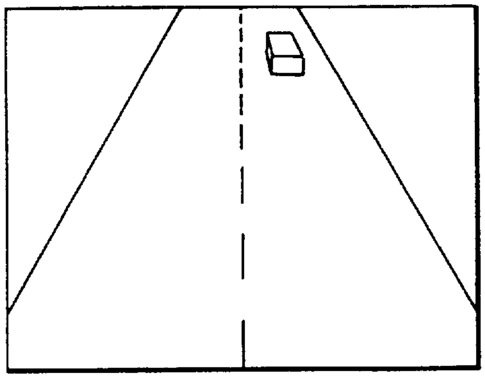
Figure 9C:
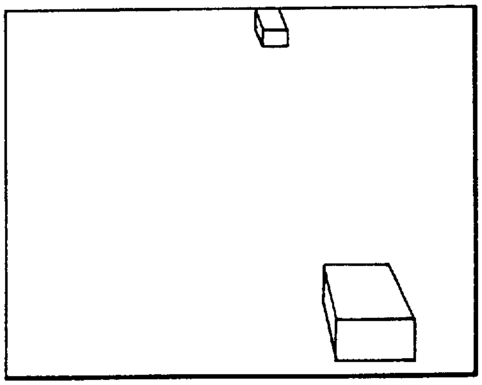
Figure 9D:
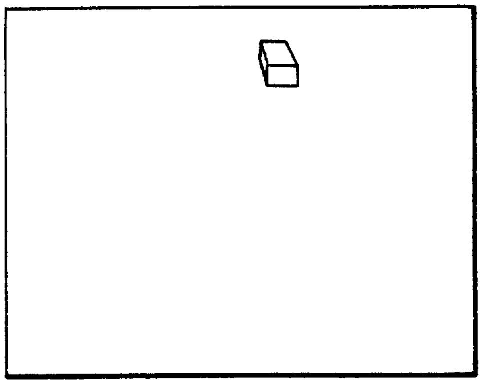
Figure 9E:
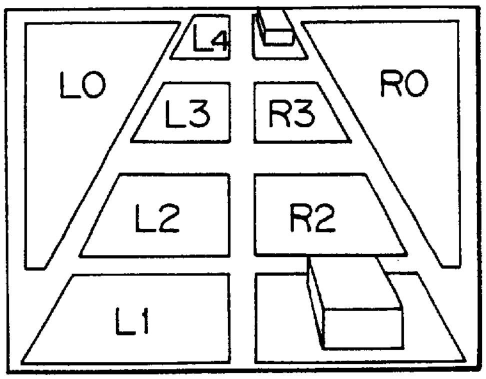
Figure 9F:
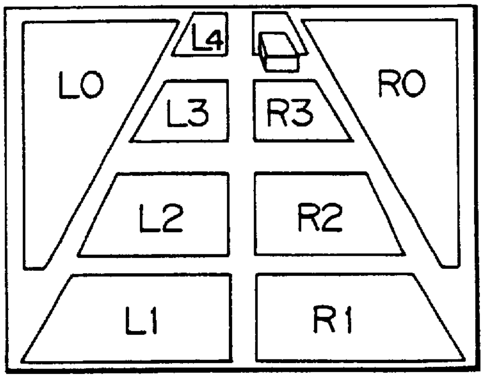
Figure 10A:
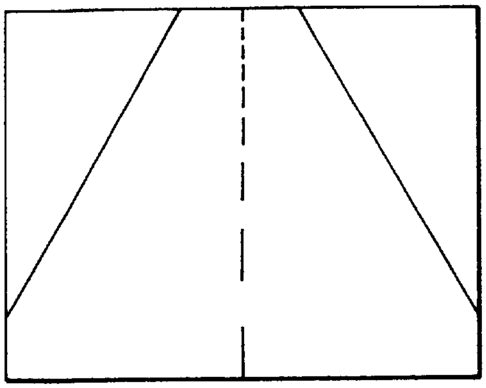
FIGS. 10(A) to 10(F) are diagrams for explaining operations of a first preferred embodiment of the present invention in the case where a plurality of objects moving at a high speed exist.
Figure 10B:
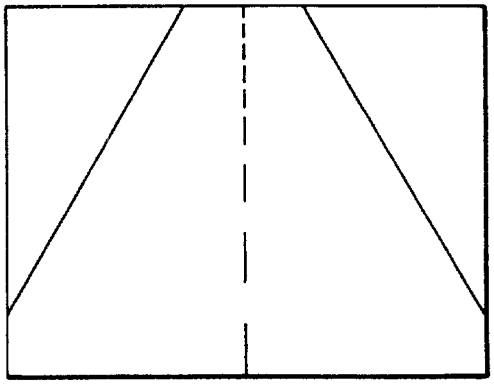
Figure 10C:
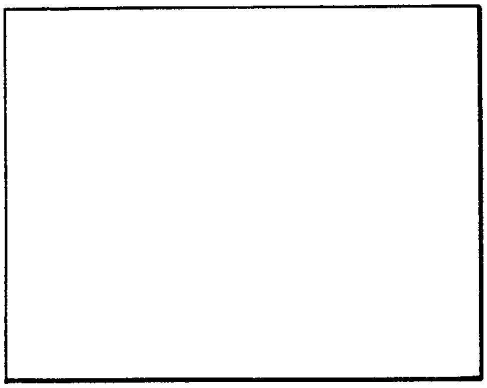
Figure 10D:
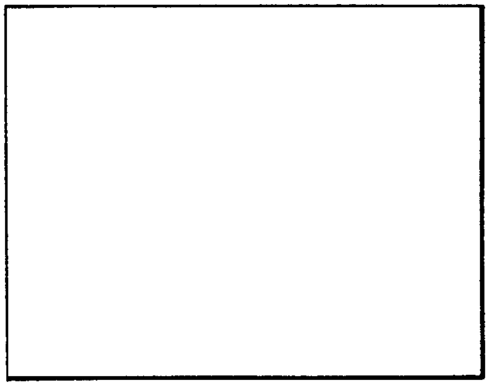
Figure 10E:
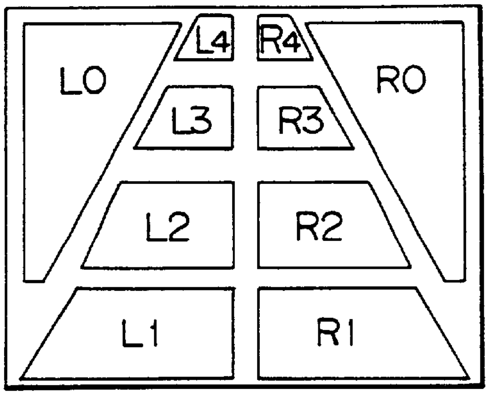
Figure 10F:
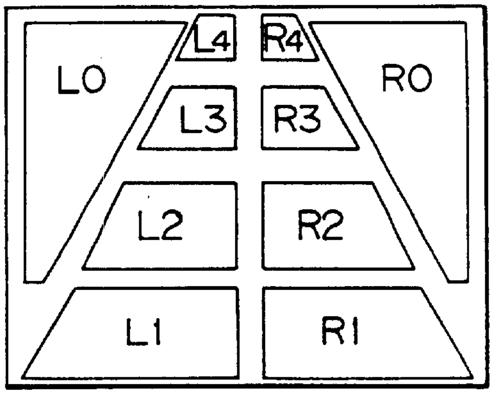

For example, as shown in FIGS. 9(A) to 9(E) and the table 2, some moving objects moving at a middle speed exist in the local areas L1, L4. In the case where a distance between the two objects is to be calculated by means of the first preferred embodiment, first, as shown in FIGS. 9(A), various characteristic-amounts or object parameters are extracted by a moving object extract unit 100, by utilizing an extraction process previously described, for each sampling time period. The moving object extract unit 101 corresponds to the average background units and the difference-calculation processing units illustrated in FIG. 1 or FIG. 2.

Further, a moving object correlating unit 101 correlates the same objects in a time series of images with each other, in accordance with the value of the characteristic-amounts using a limit value for speed of the moving objects. At this time, characteristic-amounts or parameters such as a contour of each moving object, and a position or inclination of the surface of each moving object, may be extracted from an original input image, by utilizing image density and color information for each of the moving objects.

Further, a distance measuring unit 102 measures a distance between two moving objects of the thus correlated moving objects. In this way, a compression process that converts image data into numerical data can be carried out. On the basis of such numerical data, an analysis and anticipation of the movement of each of the moving objects can be carried out.

In a case where a distance between two moving objects is calculated by means of the technique of the first preferred embodiment, an original input image is classified on the basis of the speeds of moving objects existing in the original input image. Further, a plurality of images are generated, and the thus generated images are correlated with all the moving objects. Therefore, moving objects respectively having different speeds are correlated with each other with a sufficient degree of accuracy.

However, in a case where a distance between two moving objects is calculated by means of this technique, a contour of each of moving objects, and a position of the surfaces of each of the moving objects are typically used. Accordingly, as shown in FIGS. 14(B) and 14(C), it is difficult to correlate the moving objects with each other, at the same point on the same contour and at the same point on the same surface.

More specifically, in FIGS. 14(B) and 14(C), to calculate a distance between two moving objects, a video camera (image-input unit) is set above the moving objects, and an original image is input. When the video camera is set above a road, and inputs a plurality of moving objects, e.g., cars passing through the view of the video camera, the video camera takes an image of a plurality of moving objects on the road having a black color.

In the case where two cars CA1, CA2 exist in an original image B1 as shown in FIG. 14(B), it is assumed that an edge extraction process is carried out or performed for the two cars CA1, CA2. When such an edge extraction process is executed, since a color of each of the cars is similar to that of the road, a portion of each of the two cars CA1, CA2 disappears in an edge extraction image B2 of FIG. 14(B). Therefore, if a distance between the two cars is calculated on the basis of edge extract image B2, an error corresponding to a difference between the actual value and the calculated value becomes relatively large, as shown in image B3 of FIG. 14(B).

Further, in a case where only a large-scale car LC exists in an original image C1 shown in FIG. 14(C), it is also assumed that an edge extraction process is carried out for the large-scale car LC. When such an edge extraction process is executed, the entirety of the large-scale car LC is not completely extracted. In such a situation, it is possible that the large-scale car LC will be erroneously recognized as two separate parts, in an edge extraction image C2 as shown in FIG. 14(C). Therefore, if a distance between two separate parts is erroneously calculated on the basis of edge extraction image C2, the calculated value has no meaning as shown in image C3 of FIG. 14(C).

Figure 15:
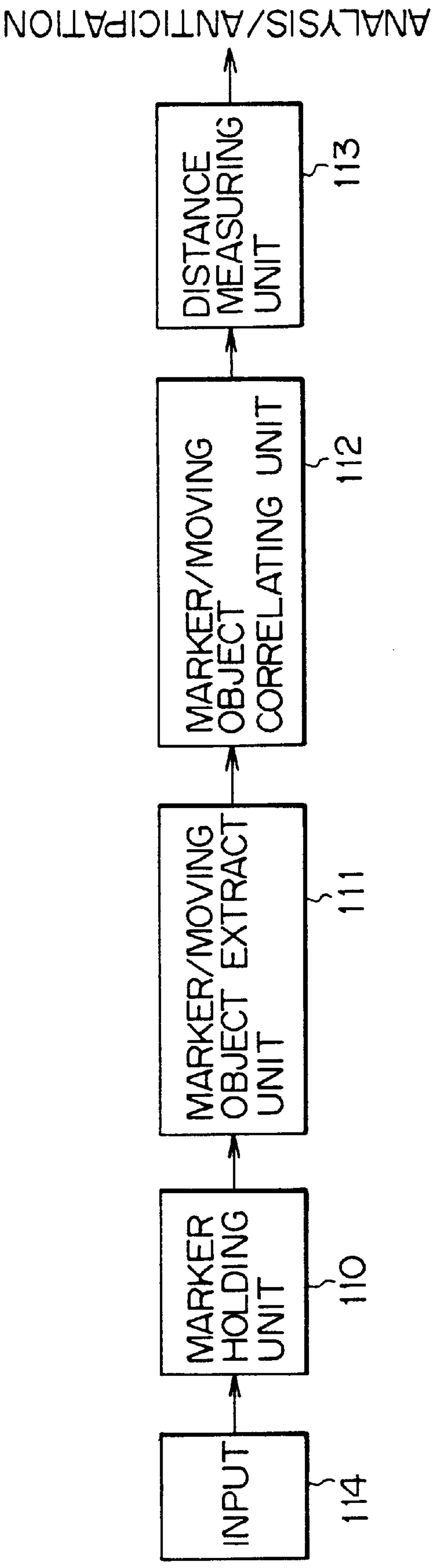
FIG. 15 is a schematic block diagram showing a third preferred embodiment of an image processing apparatus according to the present invention.

FIG. 15 is a schematic block diagram showing a third preferred embodiment of an image processing apparatus according to the present invention.

In the third preferred embodiment, with respect to the problem described above, as shown in FIG. 15, a plurality of markers are placed in advance in a background where all the objects move, by means of a marker holding unit 110. At this time, the position, the shape, and the size of each marker, et al., are calculated or known in advance.

In the implementation of the third embodiment, a plurality of markers are placed or created by drawing white lines in the road at regular spacings or intervals. However, the markers used in the present invention are not limited to white lines, and any other things having various shapes can be utilized as the markers. Further, in FIG. 15, 114 denotes an image-input unit similar to that used in FIG. 1 or FIG. 2.

In such an implementation, a marker/moving object extract unit 111 calculates or determines a portion of the image in which the moving objects and the markers overlap with each other, and extracts each of the moving objects. Further, in regard to a plurality of images which are input over a period of time, a portion of each image in which the moving objects and the markers overlap with each other can be easily extracted.

In this way, a portion of the image in which the moving objects and the markers overlap with each other can be obtained as time series data. A marker/moving object correlating unit 112 correlates the obtained data, and identifies the same moving object. Further, on the basis of the number of markers existing between two different moving objects, a distance measuring unit 113 calculates a distance between two moving objects.

In this case, the time series data concerning the markers may be correlated with each other, in place of the time series data on the moving objects. By utilizing the data about the markers, it becomes possible to grasp or identify the markers existing between the same moving objects extracted at the different sampling times, and to calculate a distance between two moving objects. By analyzing the thus calculated distance between two moving objects, an abnormality, such as an accident viewed by an image processing apparatus can be anticipated.

The construction and the operation of the third embodiment will be described in detail with reference to FIG. 16. Also, in this case, any component which is the same as that mentioned previously will be referred to using the same reference number.

Figure 16:
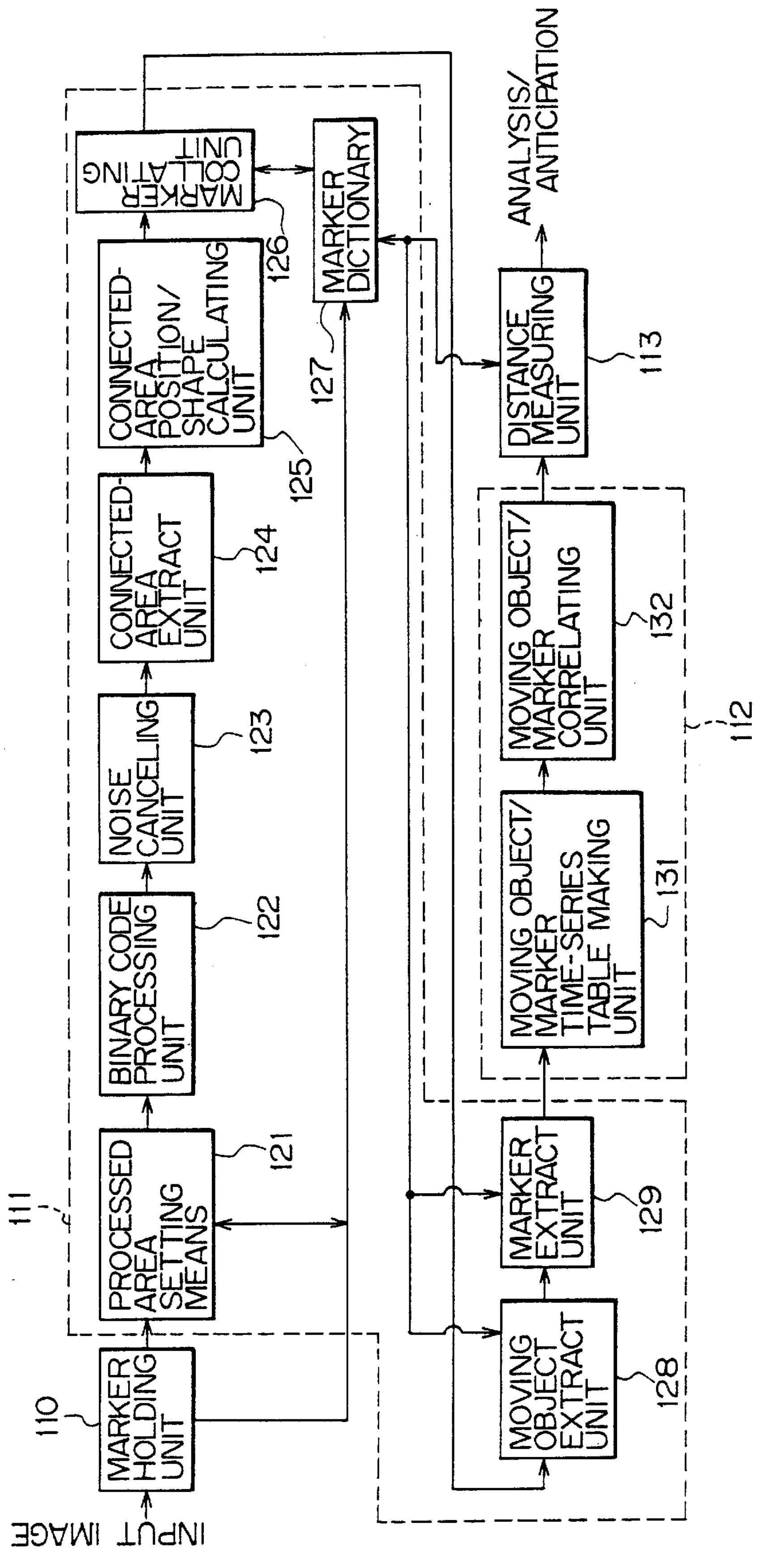
FIG. 16 is a block diagram showing in detail the main part of a third preferred embodiment of the present invention.

FIG. 16 is a block diagram showing in detail the main parts of a third preferred embodiment of the present invention.

In FIG. 16, the reference numeral 110 denotes a marker holding unit; 111 denotes a marker/moving object extract unit; 112 denotes a marker/moving object correlating unit; 113 denotes a distance measuring unit; 121 denotes a processed area setting means; 122 denotes a binary code processing unit; 123 denotes a noise canceling unit; 124 denotes a connected-area extract unit; 125 denotes a connected-area position/shape calculating unit; and 126 denotes a marker collating unit.

Further, in FIG. 16, the reference numeral 127 denotes a marker dictionary unit; 128 denotes a moving object extract unit; 129 denotes a marker extract unit; 131 denotes a moving object/marker time-series table making unit; and 132 denotes a moving object/marker correlating unit.

FIGS. 17(A) to 17(C) are diagrams showing the S condition in or positions at which markers are provided and various information about markers is registered in a marker dictionary, in this third preferred embodiment of the present invention.

The marker holding unit 110 places or notes a plurality of markers in the background. The data about these markers are stored in advance in the marker dictionary unit 127. In a case where the moving objects are cars, as shown in FIG. 17(A), the markers are obtained by coating or painting the road (hatched portion) with a plurality of white lines $P_1$, $P_2$, . . . $P_{25}$ thereon at equal spacings. In FIG. 17(B), the value of a width in each of the white lines $P_1$, $P_2$, . . . $P_2$ is 50 cm, and twenty-five (25) white lines are drawn with a spacing of 50 cm.

In this case, as shown in FIGS. 17(B) and 17(C), the value of 50 cm is indicated in a display screen by ten dots (10 dots) or image pixels. Further, the left end X coordinate is defined as the position corresponding to fifty bits in X coordinate direction. On the other hand, the right end X coordinate is defined as the position corresponding to five hundred bits (500 bits) in the X coordinate direction.

In such a condition, a coordinate (x, y) at the left upper end of the white lines $P_{25}$ is represented as (50, 480; and a coordinate (x, y) at the right lower end thereof is represented as (500, 490). The data for each coordinate (x, y) is registered or stored in the marker dictionary unit 127 by the marker holding unit 110.

In a similar manner, by virtue of the marker holding unit 110, a coordinate (x, y) at the left upper end of each of the other white lines is registered or stored in the marker dictionary unit 127. Also, a coordinate (x, y) at the right lower end thereof is represented as (500, 490) is registered in the marker dictionary unit 127. In addition, the shape of the markers (rectangular shape in this case) is registered in the marker dictionary unit 127.

Figures 18A, 18B:
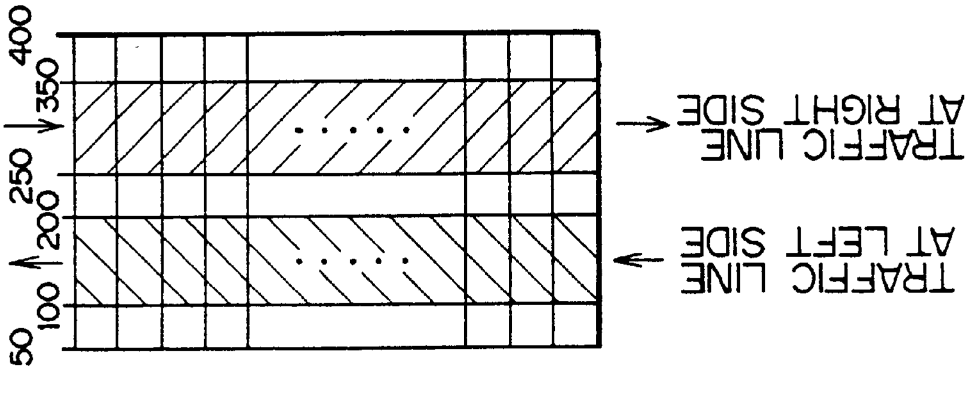
FIGS. 18(A) and 18(B) are diagrams for explaining a process of setting a region to be processed for the passage of moving objects in a third preferred embodiment of the present invention.

FIGS. 18(A) and 17(B) are diagrams used for explaining a process of setting a region of the object to be processed for the passage of moving objects in the third preferred embodiment.

The processed area setting means 121 previously mentioned with respect to FIG. 16 determines a region in which the distance between two moving objects is to be measured, in the case where some moving objects exist in a region where a plurality of white lines (markers) are placed.

For example, as shown in FIG. 18(A), it is assumed that a road has two opposed traffic lanes, and a plurality of cars move in the two opposite directions as respectively indicated by arrows. In this case, only hatched portions in the area correspond to the range of traffic lanes on the left and right sides, and are defined as a region in which the objects are to be processed. On the other hand, the other portions in the area are defined as a region in which the objects need not be processed. Namely, a masking process is executed to isolate the region in which the objects must be processed.

In FIG. 18(A), the region, in which the objects are to be processed, is defined as the hatched portions in the case of the road having two opposed traffic lanes. In accordance with the thus defined region, the marker dictionary unit 127 is updated. FIG. 18(B) illustrates the region concerning the traffic lane on the left side. In a case, where the markers are provided by taking into consideration the region in which the objects are to be processed in the traffic lanes on the left and right sides, it is not necessary to define such a processed region.

Figure 19A:
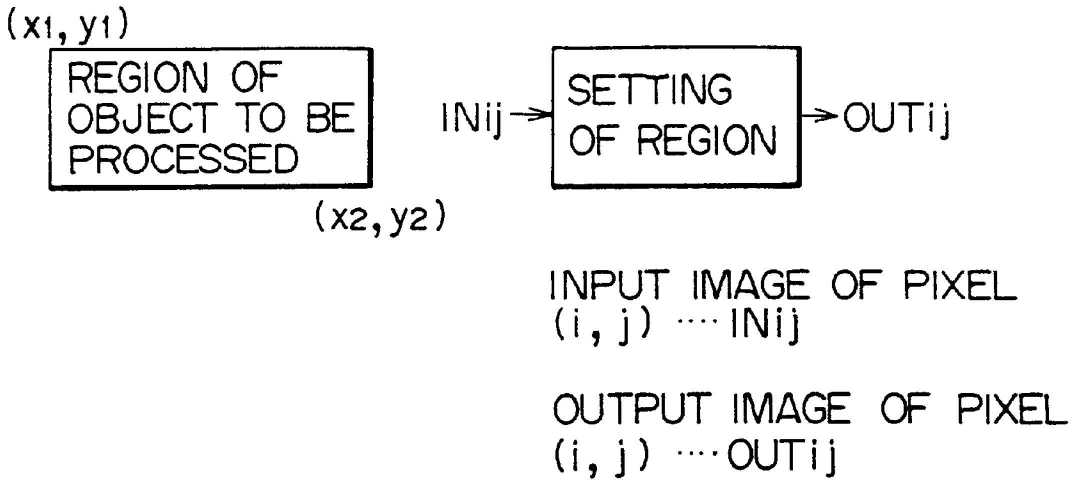
FIGS. 19(A) to 19(C) are diagrams respectively showing a region to be processed, a binary code processing unit, and a noise canceling unit, in a third preferred embodiment of the present invention.
Figure 19B:
Figure 19C:
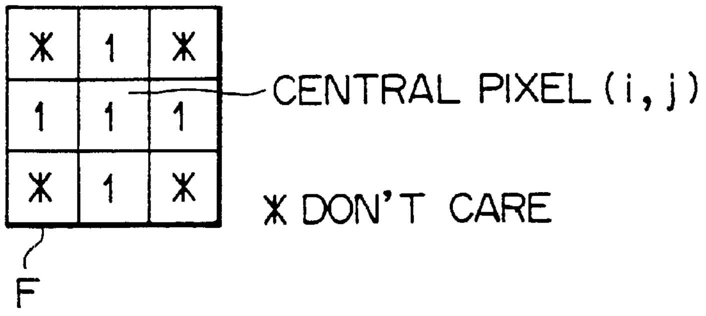

FIGS. 19(A) to 19(C) are diagrams respectively showing region isolation processing, binary code processing, and noise canceling, in the third preferred embodiment.

As shown in FIG. 19(A), it is assumed that a rectangular size of the region to be processed is defined by a coordinate (x1, y1) at the left upper end and also by a coordinate (x2, y2) at the right lower end. Further, it is assumed that an input image of a pixel (i,j) is INij, and an output image of a pixel (i,j) is OUTij.

In this case, the relationship between the input and the output image of a pixel is represented by the following equation.

if $$(y1<i\text{-row}<y2 \text{ and } x1<j\text{-column}<x2) \text{ then } OUTij=INij$$

else

OUTij=0

As is apparent from this equation, any input image existing in the region to be processed is directly output as an output image by the unit 121. However, the image features existing outside this region are output as zero (0).

As shown in FIG. 19(B), the binary code processing unit 122 outputs an output image OUTij which has the value of "1", when the value of an input image pixel INij is smaller than a threshold value th1 and larger than a threshold value th2. In other cases, the binary code processing unit 122 outputs an output image OUTij which has the value of "0". In this case, these threshold values th1, th2 are set in accordance with environmental illumination. However, in the environment in which a change of illumination may occur, these threshold values th1, th2 are adaptively adjusted, e.g., by calculating a histogram of a density of the image, etc.

The noise canceling unit 123 eliminates an isolated point of noise, in a case where the isolated point exists, in an output from the noise canceling unit 123. Namely, the noise canceling unit 123 extracts a pattern in which a plurality of dots (pixels), e.g., a group of dots which are positioned or exist in four positions.

For example, as shown in FIG. 19(C), a group of pixels are detected by utilizing a logical filter F 3×3 pixels in size. In a case where the binary value in each of four pixels positioned around a central pixel (in the upper and lower directions, and the left and right directions) becomes "1", the noise canceling unit 123 outputs an output image OUTij which has the value of "1".

Figure 20A:
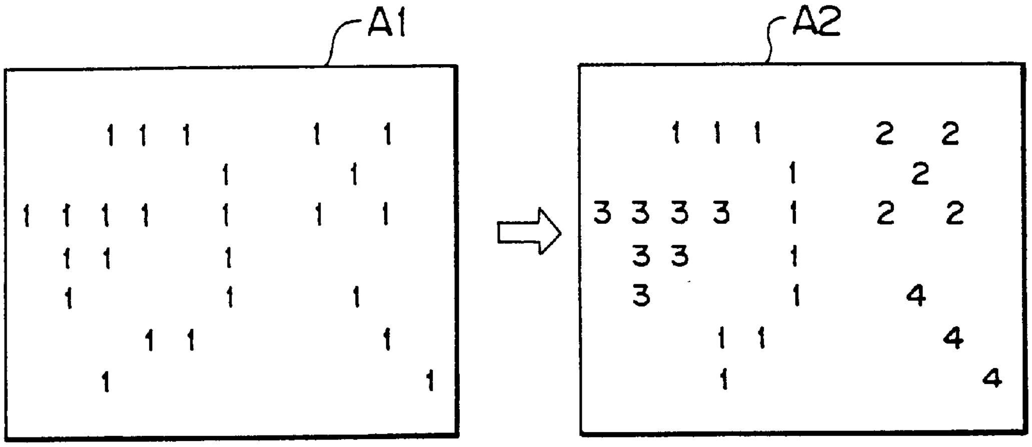
FIGS. 20(A) to 20(C) are diagrams for explaining a process of labeling a given object in a third preferred embodiment of the present invention.
Figure 20B:
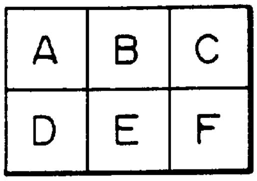
Figure 20C:
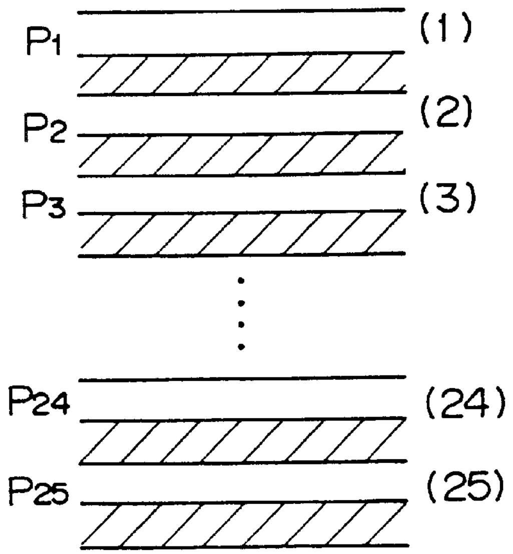

FIGS. 20(A) to 20(C) are diagrams for explaining a process of labeling a given object in the third preferred embodiment.

The connected-area extract unit 124 provides the same label for a pattern in which a large number of dots (pixels), e.g., a group of dots which are positioned adjacent to each other (an eight direction test). A group of pixels are connected when the binary value, in at least one of all eight directions including the four oblique directions, the upper and lower directions, and the left and right directions, is "1". For example, as shown in 20(A), with respect to an input image A1, the label 2, 3 and 4 are provided in a manner as shown in an image A2.

As shown in FIG. 20(B), the labeling process is executed by scanning an input image by means of several pixel patterns A to F each constituted by a matrix of 2×3. Further, in a case where the value of a given pixel E is equal to "1", the label is updated in accordance with circumferential patterns A to F.

For example, when the value of pattern D is not equal to "0"(D≠0), the label of D is transferred to attach to the given pixel E. When the value of a pattern B is not equal to "0" (B≠0), and the value of a pattern B is not equal to that of a pattern D (B≠D), the fact that the label of a pattern B is the same as that of a pattern D is stored in a table. When the value of a pattern B is equal to "0" (B=0), and the value of a pattern C is not equal to that of a pattern D (C≠D), the fact that the label of a pattern C is the same as that of a pattern D is stored in a table. When the value of patterns A to D are all equal to "0", a new label is attached to the given pixel E.

In such an implementation, an input image is first scanned. Thereafter, by utilizing a table corresponding the relation between labels, labels are attached to the input image. This technique is disclosed in Japanese Unexamined Patent Publication (Kokai) No. 3-206574 (Raster Scan Type Labeling Processing System).

The above-mentioned labeling process is realized by generalized CPU (Central Processing Unit), or DSP (Digital Signal Processor). However, with respect to a process utilizing a dedicated pipe-line processor operating at a video rate (33 msec/image), the related techniques are disclosed in Japanese Unexamined Patent Publication (Kokai) No. 61-243569 (System for Labeling to Digital Picture Area) and No. 63-27508 (Labeling Circuit for connected Area).

As a result of the labeling process, as shown in FIG. 20(C), in a case where a moving object does not exist in the input image, the same label is attached to each of the white lines in a region of object to be processed. For example, a label (1) is attached to a first white line $P_1$; a label (2) is attached to a second white line $P_2$; and a label (25) is attached to a twenty-fifth white line $P_{25}$.

Figure 21A:
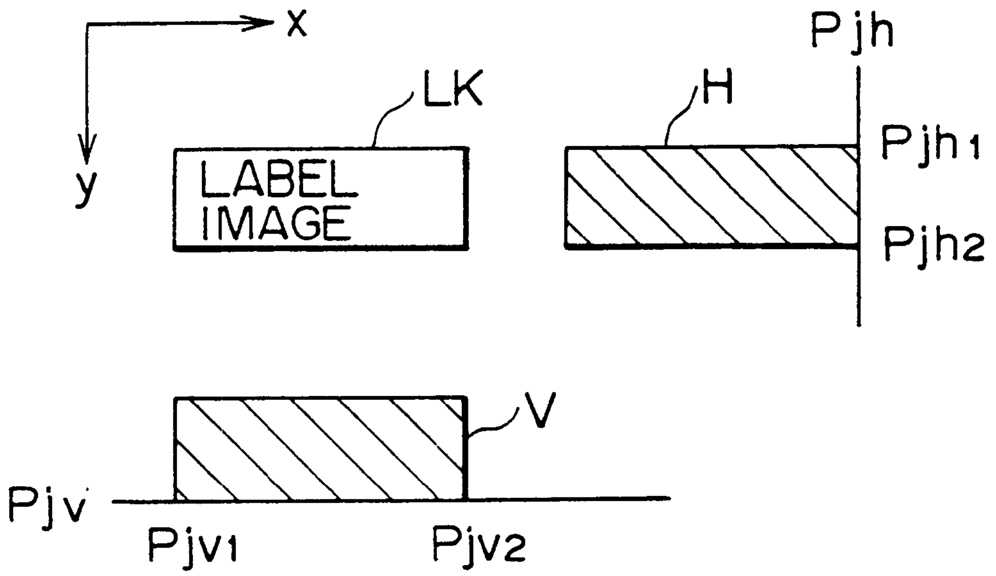
FIGS. 21(A) and 21(B) are diagrams for explaining a process of projecting a labeled object in a third preferred embodiment of the present invention.
Figure 21B:
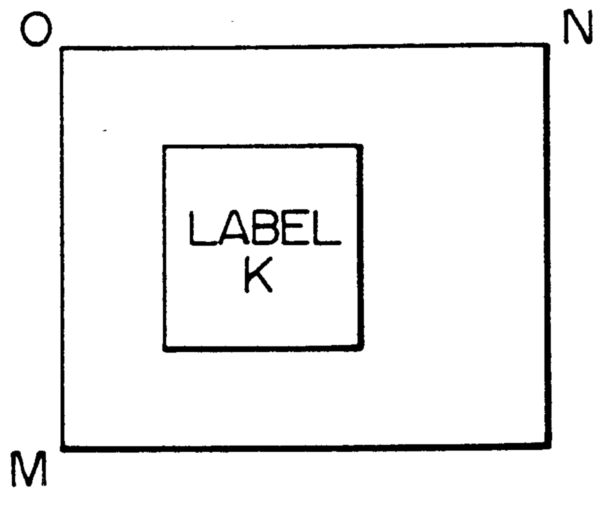

FIGS. 21(A) and 21(B) are diagrams for explaining a process of projecting a labeled object in the third preferred embodiment.

The connected-area position/shape calculating unit 125 calculates the shape and the position of a portion of each label. For example, as shown in FIG. 21(A), with respect to a label image LK to which the same labels are attached, a projection V in the vertical direction and a projection H in the horizontal direction are produced. Further, the position and the shape of each of these projections are calculated or determined. Namely, projections are estimated for every projection.

The projection H in the horizontal direction is obtained by calculating a histogram in the horizontal direction. Also, the projection V in the vertical direction is obtained by calculating a histogram in the vertical direction. Further, the position of the projection H is a longitudinal position, and the size thereof is (Pjh2, Pjh1). On the other hand, the position of the projection V is a transverse position, and the size thereof is (Pjv2, Pjv1).

In this way, information about the shape of each of the labels, longitudinal size (Pjh2, Pjh1), transverse size (Pjv2, Pjv1), and an area SUM is obtained. In a case where a product of the longitudinal size and the transverse size is equal to the area of the histogram, it is discriminated or determined that this label has a rectangular shape.

Since the label image has various image densities, projections can be obtained for each density, i.e., for every label.

More concretely, as shown in FIG. 21(B), in a case where the size of the entire image is M×N, the projection value Pjh [k] [j] in the horizontal direction for a label K, and the projection value Pjv [k] [j] in the vertical direction for the same label K is represented by the following equations (1E) and (2E), with respect to an input image IN (i, j).

$$[\text{projection value } Pjh[k][j] \text{ in the } j\text{-}th \text{ row}] \text{ for } (i=1, N)\ \{\text{if } IN(i, j)=k(\neq 0),\ Pjh[k][j]=Pjh[k][j]+1\} \quad (1E)$$

$$[\text{projection value } Pjv[k][j] \text{ in the } i\text{-}th \text{ column}] \text{ for } (i=1, M)\ \{\text{if } IN(i, j)=k(\neq 0),\ Pjv[k][j]=Pjv[k][j]+1\} \quad (2E)$$

As is apparent from the equations (1E) and (2E), within the area of the same region, by adding 1 (+1) to the original projection value in each of the horizontal direction and the vertical direction, the projection value in the j-th row and i-th column can be calculated. In such a calculation process, the projection can be easily obtained.

Further, a sum (SUM) of the projections is represented by the following equations (3E).

$$[\text{sum (SUM) of the projection}] \text{ for } (J=1, M)\ \{SUM[k]=SUM[k]+Pjh[k][j]\} \text{if } IN(i, j)=k(\neq 0),\ Pjv[k][j]=Pjv[k][j]+1\} \quad (3E)$$

The marker collating unit 126 collates the marker dictionary 127, and discriminates whether a portion of the same label calculated by the connected-area position/shape calculating unit 125 is a marker which overlaps a moving object. More specifically, a coordinate of a left upper end $P_n$(x1, y1), and a coordinate of a right lower end $P_n$(x2, y2) of a marker (white line) stored in the marker dictionary 127 are read out. As described before, the data about the white lines shown in FIG. 17(C), the data for the white lines shown in FIG. 18(B), and the like, are stored in advance in the marker dictionary 127.

Figure 22A:
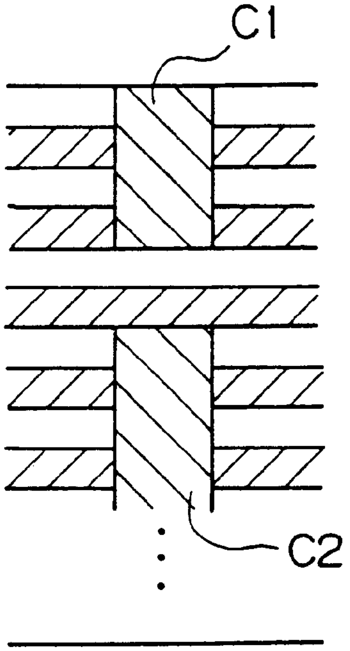
FIGS. 22(A) and 22(B) are diagrams for explaining a process of extracting a moving object which is a car having a color other than white and which passes through markers, in a third preferred embodiment of the present invention.
Figure 22B:
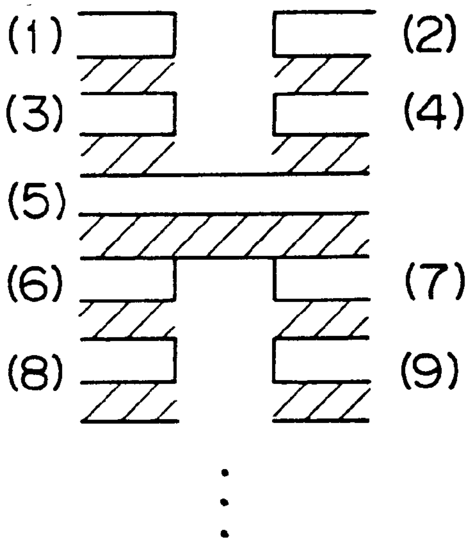

FIGS. 22(A) and 22(B) are diagrams for explaining a process of extracting a moving object which is a car having a color other than white and which passes through or over the markers in a third preferred embodiment.

The moving object extract unit 128 extracts a moving object (e.g.,car) which overlaps a marker. When cars each having a color (e.g., black, red, or blue) other than white move over a plurality of markers, the two cars $C_1$, $C_2$ and markers partially overlap with each other, as shown in FIG. 22(A). When the two cars $C_1$, $C_2$ and markers are simultaneously captured by a video camera, et al., from the above or overhead position, the two cars $C_1$, $C_2$ are separated by the markers. Therefore, moving objects such as cars can be extracted.

More specifically, as shown in 22(B), in an image portion where cars and markers overlap with each other, at least one marker is divided by the cars into two parts. Namely, at least two labels are allocated to each of the cars. Consequently, as shown in FIG. 22(B), a number of labels are provided (markers (1), (2), . . . (9)), and the number of the markers seems to increase. Further, the size of the divided markers becomes relatively small. If the number and the size of these markers are collated using the marker dictionary 127, it can be easily discriminated whether or not these markers are generated due to an overlap of the markers with moving objects, and the moving objects can be extracted.

Figure 23A:
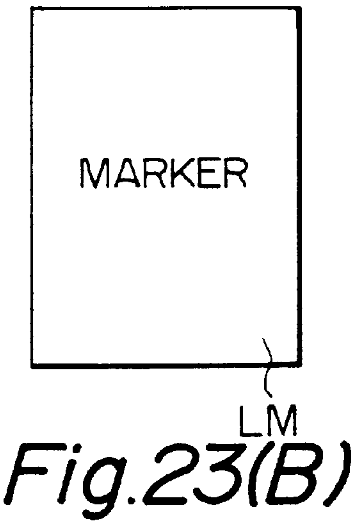
FIGS. 23(A) to 23(C) are diagrams showing other markers which can be utilized in a third preferred embodiment of the present invention.
Figure 23B:
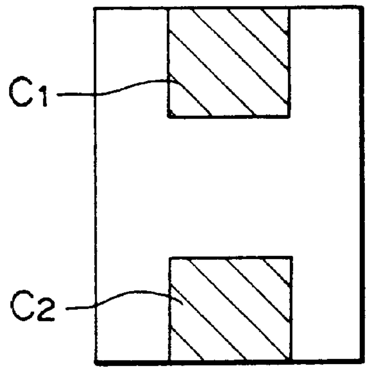
Figure 23C:
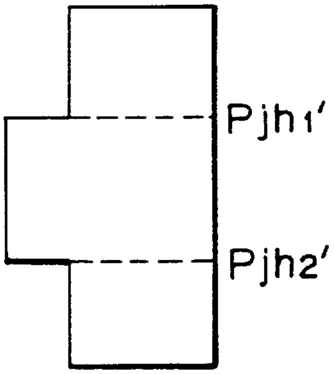

In the case where a color of a specified moving object, e.g., a car, is different from that of the markers, as shown in FIG. 23(A), it is possible to provide a marker LM much larger than cars $C_1$, $C_2$. When the cars are moving on the marker LM as shown in FIG. 23(B), the projection value in the horizontal direction is obtained, as shown in FIG. 23(C). On the basis of the projection value, the position of each of the cars can be easily extracted or determined. In this case, it is not necessary to carry out a labeling process.

Figure 24A:
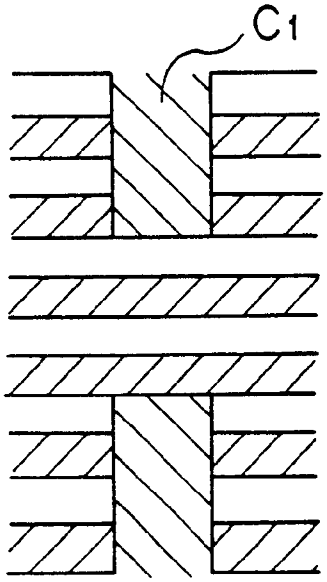
FIGS. 24(A) and 24(B) are diagrams for explaining a process of extracting a moving object which is a white car and which passes through markers, in a third preferred embodiment of the present invention.
Figure 24B:
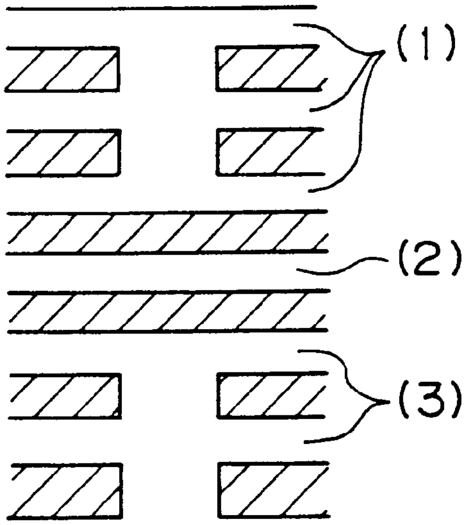

FIGS. 24(A) and 24(B) are diagrams for explaining a process of extracting a moving object which is a white car and passes through markers, in the third preferred embodiment.

In the case where white cars move on the markers of white lines, the condition of the cars $C_1$, $C_2$ and the markers is illustrated in FIG. 24(A). When this condition is input as an original input image for carrying out a labeling process, the same label is attached to a portion in which one car $C_1$ and the markers overlap with each other. Also, the same label is attached to a portion in which the other car $C_2$ and the corresponding markers overlap with each other.

Therefore, as shown in FIG. 24(B), two different labels (1), (2) are attached. Therefore, when the size of each of the labels is calculated in the connected-area position/shape calculating unit 125, an area of each of the labels (a sum (SUM) of all the projections) is larger than the area of a single marker stored in the marker dictionary 127. Further, when the shape of each of the labels is examined in the connected-area position/shape calculating unit 125, the value of a length (Pjh2–Pjh1)×a width (Pjv2–Pjv1) is different from the value stored in the marker dictionary 127. On the basis of such a discrimination or detection process, the cars can be extracted.

In a case where white cars and the markers do not completely overlap each other, as in a label (2) shown in FIG. 23(B), the size and the shape of each of the labels conform to the size and the shape of one marker. Therefore, it is possible to detect or determine a distance between two cars.

The marker extract unit 129 extracts the markers, and calculates a distance between two cars. In the case where cars having a color other than white and pass through or over the markers, as in a label (5) shown in FIG. 22(A), it is discriminated or determined whether the size and the shape (rectangular) of a portion to which the same label is attached conforms to the data stored in the marker dictionary 127. If it is confirmed that the size and the shape of the same label conform to the data stored in the marker dictionary 127, the same label is detected as one of markers. In this case, in accordance with the data in the marker dictionary 127, the size of each of the markers and the space between the markers can be calculated, and a distance between two cars can be calculated.

In the case where each of the markers has the shape shown in FIG. 23(A), a projection of an original marker and a continuous region from Pjh1 to Pjh2 can be obtained, and on the basis of a region from Pjh1 to Pjh2, a distance between two cars can be calculated.

FIGS. 25(A) to 25(E) are diagrams showing various tables which are utilized for calculating a distance between two moving objects in the third preferred embodiment.

Figures 25A, 25B, 25C, 25D, 25E:
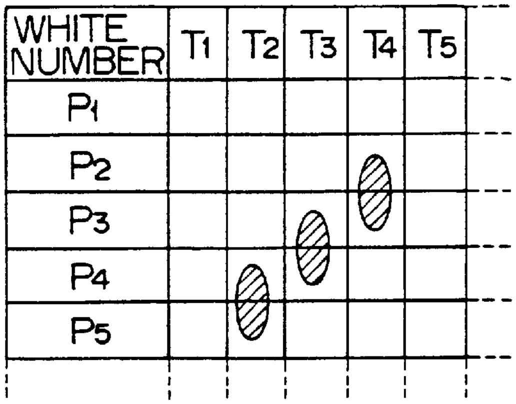
FIGS. 25(A) to 25(E) are diagrams showing various tables which are utilized for calculating a distance between two moving objects in a third preferred embodiment of the present invention.

The moving object/marker time-series table making unit 131 creates a time-series table of the moving objects and the markers associated with which the moving objects exist. As shown in FIG. 25(A), the time-series table of the moving objects indicates the position of each moving object with respect to the markers. In this case, it is assumed each of the moving objects moves from marker $P_{25}$ to $P_2$.

In a case where only the moving objects are taken into consideration, as indicated by circles in FIG. 25(A), the relationship between the time when the moving objects exist in the image and the relative position of each marker (the number of white lines) is established by the time-series table.

Further, as shown in FIG. 25(A), by creating a table showing markers existing between the moving objects, a locus of each marker existing between the moving objects can be indicated.

The moving object/marker correlating unit 132 provides the same number for each of the moving objects which are discriminated or determined to be the same. In this discrimination, the condition that different moving objects have a predetermined distance, and also a direction (in this case, the direction in which moving objects move is $P_{25}$ to $P_1$) are considered. Further, as shown in FIG. 25(C), by making a time-series table showing markers existing between the moving objects, the correspondence relation between the moving objects (shown in FIG. 25(B)) and the related markers can be clarified.

In such a technique, each of the markers is traced by taking only markers existing between moving objects into consideration. Therefore, the number necessary for the correlation between the moving objects and the markers can be reduced. Consequently, as compared to the case in which moving objects are extracted without markers, the technique of the third embodiment allows an extracting or identification process to be carried out at a high speed.

In this case, as shown in FIG. 25(A), a distance between two cars is defined by two white lines $P_4$, $P_5$ at the sampling time $T_2$, while the distance is defined by two white lines $P_3$, $P_4$ at the sampling time $T_3$. At this sampling time, the subject car exists over a plurality of white lines. This phenomenon is illustrated in FIG. 25(E). In FIG. 25(E), the same mark is provided for a plurality of white lines, to indicate that the subject car moves on or over a plurality of white lines.

The distance measuring unit 113 measures a distance between two moving objects, e.g., cars. For example, as shown in FIG. 25(B), on the basis of a correlation in the table between moving objects, the distance between two moving objects is estimated by calculating a distance between white lines (markers) at each sampling time. Further, the maximum value, the minimum value, and the average value are calculated. For example, moving objects are correlated with a plurality of images at the sampling time $T_m$ to $T_n$, and the average value are calculated by utilizing the following equation (4E). Here, a difference between white lines (WL) is defined as Δn–Δm.

$$\text{average}=\Sigma\Delta i(\text{distance between WL})/(m-n+1)\,i=n,m \tag{4E}$$

Further, a modification of a connected-area extract unit 124 and a connected-area position/shape calculating unit 125 in the third preferred embodiment will be described with reference to FIGS. 26(A) to 26(E).

In this case, the modified connected-area extract unit 124 extracts a contour corresponding to a portion where each binary code of binary information is "1". Alternatively, a contour obtained by a color (color of the marker) extracting process can be extracted by the connected-area extract unit 124.

Further, a starting point for the extracting process, the maximum and minimum value of x, y, a length of a circumference are stored in advance, and a contour extracting process is started. In executing the contour extracting process, the maximum and minimum value of x, y, and a length of the circumference of the contour are calculated.

Figure 26A:
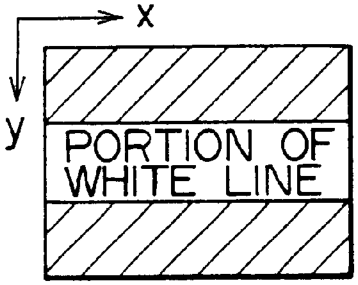
FIGS. 26(A) to 26(E) are diagrams for explaining a process of extracting a contour in a connected area in a third preferred embodiment of the present invention.
Figure 26B:
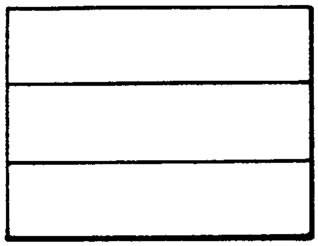
Figure 26C:
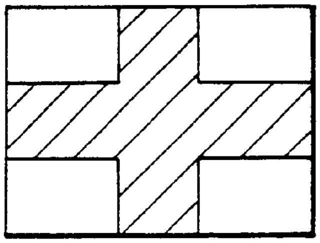
Figure 26D:
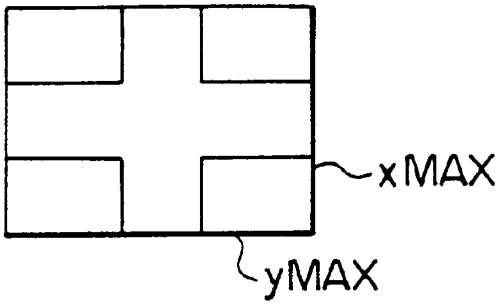

As shown in FIG. 26(B), in a case where the contour extracting process is carried out only on the white lines, the thus extracted data conforms to the data stored in the marker dictionary 127. However, in the case where moving objects overlap the white lines, as shown in FIGS. 26(C) and 26(D), at least one of the data items does not conform to the data stored in the marker dictionary 127. A technique for color extracting process is disclosed in Japanese Unexamined Patent Publication (Kokai) No. 63-314988 (Video Rate Color Extracting Device).

The connected-area position/shape calculating unit 125 compares the maximum and minimum value in both of the x-component and y-component and the value of the length of the circumference with the values stored in the marker dictionary 127. Further, it is concluded that a contour has a rectangular shape, in a case where the maximum and minimum value in both of the x-component direction and y-component direction and the value of the length of the circumference conform to the value stored in the marker dictionary 127.

Figure 26E:
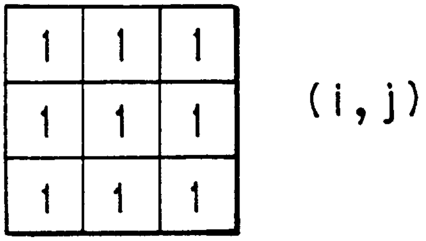

Further, as shown in FIG. 26(E), in carrying out such a contour extracting process, the entire image is scanned by utilizing a logical filter of 3×3 pixels. In the case where the value of a portion around a central pixel (i, j) is all "1", it is discriminated that this region is related to an inner part of each marker, and "0" is output. In the other case, it is discriminated that this region is a boundary, and "1" is output.

While the present invention has been described as related to the preferred embodiments, it will be understood that various changes and modifications may be made without departing from the spirit and the scope of the invention as hereinafter claimed.

What is claimed is:

1. An image processing apparatus for calculating a distance between two moving objects contained in time series images which are captured at different sampling times, comprising:

an image-input unit which inputs said image including a background and a plurality of objects;

a marker holding unit which records location information of a plurality of markers in said background;

a moving object extract unit which extracts a plurality of moving objects;

a moving object/marker time-series table making unit which creates a time-series table of said plurality of moving objects and said markers, each existing between two different moving objects;

a marker extract unit which extracts the markers existing between two different moving objects; and a distance measuring unit which calculates a distance between two different moving objects, on the basis of respective sizes of the extracted markers existing therebetween.

2. An image processing apparatus as set forth in claim 1, wherein:

a plurality of markers, which are not connected with each other, are provided in said background by said marker holding unit; and said apparatus further comprises:

a connected-area position/shape calculating unit which calculates a size, a shape, and a number of said markers;

a marker dictionary unit which has a marker dictionary for storing in advance the size and the shape of said markers; and a marker collating unit which collates said marker dictionary and discriminates whether or not a portion of a marker calculated by said connected-area position/shape calculating unit is a marker which overlaps a moving object, and wherein said apparatus is adapted to determine a number of the markers which can be identified as a result of the collation in said marker collating unit, and to calculate said distance between said two moving objects.

3. An image processing apparatus as set forth in claim 2, wherein said apparatus is adapted to track a number of markers existing between two different moving objects, and to calculate said distance between the two different moving objects.

4. An image processing apparatus for calculating a distance between two cars in a case where a plurality of cars are contained in a time series of images which are captured at different sampling times as moving objects, comprising:

a marker holding unit which locates a plurality of white lines which are perpendicular to a direction in which the cars move, with equal spaces between adjacent white lines, as a plurality of markers;

a marker dictionary unit which has a marker dictionary for providing in advance a value of a length and breadth of each of said white lines, and also storing in advance said value of said length and breadth thereof;

a connected-area extract unit which extracts some areas which are obtained by continuous white lines existing at positions overlapped with each of said moving objects, and labels said extracted areas with a common label;

a connected-area position/shape calculating unit which calculates a size and a shape of the labeled areas respectively corresponding to regions formed by said continuous white lines, and confirms the size of the white lines in said regions formed by said continuous white lines and the size of shape corresponding to each of the thus labeled areas, in accordance with the value of a length and breadth of each of the white lines;

a moving object/marker correlating unit which tracks a specified region formed by said continuous white lines; and a distance measuring unit which extracts a number of said continuous white lines from the white lines confirmed by said connected-area position/shape calculating unit, and calculates said distance between said two moving objects on the basis of a total sum of spaces between said continuous white lines.

5. An image processing apparatus as set forth in claim 4, wherein said connected-area position/shape calculating unit is adapted to separate each of said connected areas into a plurality of connected components, and to obtain a value of a projection for each of the connected components, wherein said connected-area position/shape calculating unit is adapted to calculate a value of length and breadth for each of said connected areas, and to compare a product of the value of said length and the value of said breadth with a total sum of the value of each projection, and wherein said connected-area position/shape calculating unit is adapted to discriminate whether each of said connected areas has a rectangular shape.

6. An image processing apparatus as set forth in claim 4, wherein said connected-area position/shape calculating unit is adapted to extract a contour from a two-dimensional image in which binary code processing is carried out and color extraction processing is carried out, and to obtain a maximum and minimum value in x-component and y-component directions of said contour and also the value of a length of a circumference of said contour, and wherein said connected-area position/shape calculating unit is adapted to compare said maximum and minimum value and said value of said length of circumference with values stored in advance, and to conclude that said contour has the rectangular shape, in a case where said maximum and minimum value and said value of said length of circumference conform to said values stored in advance.

7. An image processing apparatus as recited in claim 6, wherein said image processor performs one of determining distances between the objects, determining locations of the objects and determining sizes of the objects.

* * * * *

UNITED STATES PATENT AND TRADEMARK OFFICE

CERTIFICATE OF CORRECTION

PATENT NO. : 6,430,303 B1 
DATED : August 6, 2002
INVENTOR(S) : Satoshi Naoi et al.

It is certified that error appears in the above-identified patent and that said Letters Patent is hereby corrected as shown below:

Title page,
Item [30], Foreign Application Priority Data, change "(JO)" to -- (JP) --.

Signed and Sealed this

Thirty-first Day of December, 2002

JAMES E. ROGAN
*Director of the United States Patent and Trademark Office*